United States Patent
Tzschoppe

(10) Patent No.: US 8,106,938 B2
(45) Date of Patent: Jan. 31, 2012

(54) ARRANGEMENT FOR REALIZING A THREE-DIMENSIONAL REPRESENTATION

(75) Inventor: Wolfgang Tzschoppe, Jena-Rothenstein (DE)

(73) Assignee: Phoenix 3D, Inc., Merrick, NY (US)

( * ) Notice: Subject to any disclaimer, the term of this patent is extended or adjusted under 35 U.S.C. 154(b) by 1488 days.

(21) Appl. No.: 10/554,900

(22) PCT Filed: Apr. 28, 2004

(86) PCT No.: PCT/EP2004/004464
§ 371 (c)(1),
(2), (4) Date: Oct. 28, 2005

(87) PCT Pub. No.: WO2004/098203
PCT Pub. Date: Nov. 11, 2004

(65) Prior Publication Data
US 2006/0285206 A1    Dec. 21, 2006

(30) Foreign Application Priority Data

Apr. 30, 2003  (DE) .................................. 103 20 530

(51) Int. Cl.
*H04N 13/04* (2006.01)
(52) U.S. Cl. ................ 348/51; 359/462; 345/6; 345/32; 345/55; 349/122
(58) Field of Classification Search .................... 348/51; 345/6, 32, 55; 349/122; 359/462
See application file for complete search history.

(56) References Cited

U.S. PATENT DOCUMENTS

| | | | | |
|---|---|---|---|---|
| 5,315,377 A | * | 5/1994 | Isono et al. ...................... | 348/51 |
| 6,040,807 A | * | 3/2000 | Hamagishi et al. ................ | 345/6 |
| 6,337,721 B1 | | 1/2002 | Hamagishi et al. | |
| 2003/0067539 A1 | * | 4/2003 | Doerfel et al. .................. | 348/51 |

FOREIGN PATENT DOCUMENTS

| | | |
|---|---|---|
| DE | 100 03 326 A1 | 8/2001 |
| DE | 201 21 318 U1 | 8/2002 |
| WO | WO 01/18589 A1 | 3/2001 |

OTHER PUBLICATIONS

Dumbreck, A.A. and Smith, C.W., "3-D TV displays for industrial applications," IEE Colloquium on Stereoscopic Television, Oct. 15, 1992, pp. 7/1-7/4.

* cited by examiner

*Primary Examiner* — King Y Poon
*Assistant Examiner* — David S Cammack

(57) ABSTRACT

The invention relates to arrangements and methods for spatially displaying images of a scene or object, in which several viewers can get a spatial impression without the use of aids. Arrangements according to the invention comprise an image display device and at least one filter array with a great number of filter elements; characteristically, it is not in all rows (j) and columns (i) that partial image information from different views is alternatingly displayed by the pixels of the image display device in such a way that, from at least two monocular viewing positions, exclusively or almost exclusively partial image information from a single view is visible to one of the viewer's eyes, and that, from a great number of viewing positions, essentially bits of partial image information from different views are visible monocularly to both eyes of the viewer, and that the viewer has a spatial view of the scene or object displayed.

2 Claims, 26 Drawing Sheets

| i\j | 1 R | 2 G | 3 B | 4 R | 5 G | 6 B | 7 R | 8 G | 9 B | 10 R | 11 R | 12 B | 13 R | 14 G | 15 B | 16 R |
|---|---|---|---|---|---|---|---|---|---|---|---|---|---|---|---|---|
| 1 R | 1 | 2 | 2 | 3 | 4 | 4 | 1 | 2 | 2 | 3 | 4 | 4 | 1 | 2 | 2 | 3 |
| 2 G | 1 | 2 | 2 | 3 | 3 | 4 | 1 | 1 | 2 | 3 | 3 | 4 | 1 | 2 | 2 | 3 |
| 3 B | 2 | 2 | 3 | 4 | 4 | 1 | 2 | 2 | 3 | 4 | 4 | 1 | 2 | 2 | 3 | 4 |
| 4 R | 2 | 3 | 3 | 4 | 1 | 1 | 2 | 3 | 3 | 4 | 1 | 1 | 2 | 3 | 3 | 4 |
| 5 G | 2 | 3 | 4 | 4 | 1 | 2 | 2 | 3 | 4 | 4 | 1 | 2 | 2 | 3 | 4 | 4 |
| 6 B | 3 | 3 | 4 | 1 | 1 | 2 | 3 | 3 | 4 | 1 | 1 | 2 | 3 | 3 | 4 | 1 |
| 7 R | 3 | 4 | 4 | 1 | 2 | 2 | 3 | 4 | 4 | 1 | 2 | 2 | 3 | 4 | 4 | 1 |
| 8 G | 3 | 4 | 1 | 1 | 2 | 3 | 3 | 4 | 1 | 1 | 2 | 3 | 3 | 4 | 1 | 1 |
| 9 B | 4 | 4 | 1 | 2 | 2 | 3 | 4 | 4 | 1 | 2 | 2 | 3 | 4 | 4 | 1 | 2 |
| 10 R | 4 | 1 | 1 | 2 | 3 | 3 | 4 | 1 | 1 | 2 | 3 | 3 | 4 | 1 | 1 | 2 |
| 11 R | 4 | 1 | 2 | 2 | 3 | 4 | 4 | 1 | 2 | 2 | 3 | 4 | 4 | 1 | 2 | 2 |
| 12 B | 1 | 1 | 2 | 3 | 3 | 4 | 1 | 1 | 2 | 3 | 3 | 4 | 1 | 1 | 2 | 3 |
| 13 R | 1 | 2 | 2 | 3 | 4 | 4 | 1 | 2 | 2 | 3 | 4 | 4 | 1 | 2 | 2 | 3 |
| 14 G | 1 | 2 | 3 | 3 | 4 | 1 | 1 | 2 | 3 | 3 | 4 | 1 | 1 | 2 | 3 | 3 |
| 15 B | 2 | 2 | 3 | 4 | 4 | 1 | 2 | 2 | 3 | 4 | 4 | 1 | 2 | 2 | 3 | 4 |
| 16 R | 2 | 3 | 3 | 4 | 1 | 1 | 2 | 3 | 3 | 4 | 1 | 1 | 2 | 3 | 3 | 4 |
| 17 G | 2 | 3 | 4 | 4 | 1 | 2 | 2 | 3 | 4 | 4 | 1 | 2 | 2 | 3 | 4 | 4 |
| 18 B | 3 | 3 | 4 | 1 | 1 | 2 | 3 | 3 | 4 | 1 | 1 | 2 | 3 | 3 | 4 | 1 |
| 19 R | 3 | 4 | 4 | 1 | 2 | 2 | 3 | 4 | 4 | 1 | 2 | 2 | 3 | 4 | 4 | 1 |
| 20 G | 3 | 4 | 1 | 1 | 2 | 3 | 3 | 4 | 1 | 1 | 2 | 3 | 3 | 4 | 1 | 1 |
| 21 B | 4 | 4 | 1 | 2 | 2 | 3 | 4 | 4 | 1 | 2 | 2 | 3 | 4 | 4 | 1 | 2 |
| 22 R | 4 | 1 | 1 | 2 | 3 | 3 | 4 | 1 | 1 | 2 | 3 | 3 | 4 | 1 | 1 | 2 |
| 23 G | 4 | 1 | 2 | 2 | 3 | 4 | 4 | 1 | 2 | 2 | 3 | 4 | 4 | 1 | 2 | 2 |
| 24 B | 1 | 1 | 2 | 3 | 3 | 4 | 1 | 1 | 2 | 3 | 3 | 4 | 1 | 1 | 2 | 3 |
| 25 R | 1 | 2 | 2 | 3 | 4 | 4 | 1 | 2 | 2 | 3 | 4 | 4 | 1 | 2 | 2 | 3 |
| 26 G | 1 | 2 | 3 | 3 | 4 | 1 | 1 | 2 | 3 | 3 | 4 | 1 | 1 | 2 | 3 | 3 |

ARRANGEMENT FOR REALIZING A THREE-DIMENSIONAL REPRESENTATION

FIELD OF THE INVENTION

The invention relates to arrangements for the three-dimensional display, especially to such that provide a spatial impression to one or several viewers without any aids such as filter goggles.

BACKGROUND OF THE INVENTION

Many methods and arrangements for spatial display are known that are based on the spatial or temporal splitting of different views of a scene on some image display device. The said views are, as a rule, either images of layers of different depths in space, or images recorded from different angles. Among the said image display devices, LC displays, for example, are increasingly used. U.S. Pat. No. 5,936,774, for example, describes methods and an arrangement for the autostereoscopic display of between two and four perspective views on an LC display. EP 0 791 847, EP 0 783 825, and JP 8 194 190 also describe arrangements for autostereoscopic presentation based on LC displays. An advantageous arrangement of this kind is described in DE 100 03 326 C2. This arrangement uses at least one wavelength filter array, which establishes different propagation directions for light coming from different pixels. The said pixels render bits of partial image information from different views of a scene or object. Because of the given light propagation directions, the viewer's two eyes predominantly see two different selections (a first and second selection, respectively) of views, which gives the said viewer a three-dimensional impression.

SUMMARY OF THE INVENTION

It is the purpose of the present invention to develop arrangements of the kind indicated above in such a way that an improved image quality results.

According to the invention, the problem is solved by an arrangement for spatial display,
comprising an image display device with a great number of picture elements (pixels) $\alpha_{ij}$ arranged in a grid of columns i and rows j, on which bits of partial image information from different views $A_k$ (k=1 . . . n, n>1) of a scene or object can be displayed,
and further comprising at least one filter array arranged in front of or behind the image display device (seen in viewing direction) and consisting of a great number of filter elements $\beta_{pq}$ arranged in a grid of rows q and columns p, and transmitting light of different wavelength ranges and/or with different transmittances $\lambda_b$, with each filter element $\beta_{pq}$ essentially having the size of a pixel $\alpha_{ij}$, and with a great number of the filter elements $\beta_{pq}$ being essentially opaque and a great number of them being essentially transparent to visible light, so as to establish propagation directions for the light radiated by the pixels $\alpha_{ij}$,
and in which bits of partial image information from the views $A_k$ (k=1 . . . n) are assigned to pixels $\alpha_{ij}$ of the position i,j according to the equation $$k = i - c_{ij} \cdot j - n' \cdot IntegerPart\left[\frac{i - c_{ij} \cdot j - 1}{n'}\right],$$

where
- k is the consecutive number of the view $A_k$ (k=1 . . . n) from which the bit of partial information to be rendered on a particular pixel $\alpha_{ij}$ originates,
- n is the total number of views $A_k$ (k=1 . . . n) employed,
- n' is a selectable integral number greater than zero,
- $c_{ij}$ is a selectable coefficient matrix for combining or mixing on the grid the various bits of partial information originating from the views $A_k$ (k=1 . . . n), and
- IntegerPart is a function for generating the greatest integral number that does not exceed the argument put in square brackets, and in which
the filter elements $\beta_{pq}$, depending on their transmission wavelength range and/or transmittance $\lambda_b$, are arranged on the grid of rows q and columns p according to the following equation:

$$b = p - d_{pq} \cdot q - n_m \cdot IntegerPart\left[\frac{p - d_{pq} \cdot q - 1}{n_m}\right],$$

where
- b is an integral number that, for a filter element $\beta_{pq}$ in the position p,q, defines one of the intended transmission wavelength ranges and/or transmittances $\lambda_b$, and that may adopt values between 1 and $b_{max}$,
- $n_m$ is an integral number greater than zero that preferably corresponds to the integral number n',
- $d_{pq}$ is a selectable mask coefficient matrix for varying the generation of a mask image, and
- IntegerPart is a function for generating the greatest integral number that does not exceed the argument put in square brackets, in which, according to the invention,
- the pixels $\alpha_{ij}$ not of all rows j and columns i alternatingly present bits of partial image information from different views $A_k$ in such a way that, from at least two monocular viewing positions, one of the viewer's eyes exclusively or almost exclusively sees partial image information from a single view $A_k$, and that, from a great number of viewing positions, each of the viewer's eyes monocularly sees essentially bits of partial image information from different views $A_k$ so that the viewer has a spatial view of the scene or object presented.

The (great number of) propagation directions established for the light radiated by the pixels $\alpha_{ij}$ intersect in a great number of points, each of which may coincide with a viewer's eye position.

The transmission wavelength ranges or transmittances $\lambda_b$ to be selected may be, e.g., the wavelength range of red, green or blue light, or transmittances that are essentially opaque and transparent to visible light. Moreover, transmittances may be defined that are, to the greatest possible degree, independent of wavelength, for example, a transmittance of 75% for essentially all of the visible light.

A combination of transmission wavelength ranges and transmittances is possible as well, e.g., a transmittance of 50% to red light.

With particular preference, the arrangement according to the invention designed in such a way that $d_{pq}$ and $c_{ij}$ are identical or selected so as to make b(p, q)=k (i, j) for all pairs (p=i, q=j); preferably, exactly one (or a few) of the 1 . . . $b_{max}$ transmission wavelength ranges or transmittances $\lambda_b$ intended is selected to be transparent to essentially the entire visible spectrum, whereas the remaining transmission wavelength ranges or transmittances $\lambda_b$ are selected to be opaque to essentially the entire visible spectrum. This ensures that the image combination structure of the partial image information from different views $A_k$ on the image display device closely resembles the structure on the filter array; strictly speaking, the arrangement pattern of those pixels $\alpha_{ij}$ on the image display device which render image information from exactly one particular view $A_k$ is provided in equivalent form on the filter array by means of the filter elements $\beta_{pq}$ that transmit essentially the entire visible spectrum.

Another embodiment of the invention is characterized by the fact that—apart from marginal zones of the filter array—each of the filter elements $\beta_{pq}$ essentially transparent to visible light immediately borders on at least one other filter element $\beta_{pq}$ essentially transparent to visible light in at least one row, and/or in at least one column.

Both the pixels $\alpha_{ij}$ and the filter elements $\beta_{pq}$ have essentially polygonal, preferably rectangular outlines. Nevertheless it also possible that filter elements $\beta_{pq}$ have, at least in part, non-angular, for example, rounded outline segments.

Furthermore, as a rule, at least some mutually adjacent filter elements $\beta_{pq}$ border on each other at one or several edges of the polygonal, preferable rectangular outline.

In most of the arrangements described so far it is inherent that, out of a number of monocular viewing positions in the viewing space in front of the arrangement, bits of partial image information from at least two views $A_k$ are made visible to one of the viewer's eyes, with at least one fifth of all visible pixels $\alpha_{ij}$ being essentially completely visible to that eye. In that way, one of the viewer's eyes, from several first viewing positions, essentially sees partial image information from exactly one view $A_k$, whereas, from other (second) viewing positions, the said viewer's eye sees an image mixed from bits of partial image information of several views. This mixed image can be caused (1) from the shift of the respective eye from the first to the second viewing positions in the plane parallel to the plane of the pixels, and (2) from a change of the distance of the respective eye from the plane of the pixels.

Preferably, the arrangement has exactly one array of filter elements $\beta_{pq}$, and the distance z between the said array and the grid of pixels $\alpha_{ij}$, measured along the normal, is defined by the following equation:

$$\frac{p_d}{s_p} = \frac{d_a \pm z}{z}.$$

Here, $s_p$ denotes the mean horizontal distance between two adjacent pixels $\alpha_{ij}$. If the filter array is arranged (in the viewing or normal direction) in front of the grid of pixels $\alpha_{ij}$, z is subtracted from $d_a$; if the filter array is arranged behind it, z is added to $d_a$. $p_d$ is the viewer's mean pupil distance, and $d_a$ is a selectable viewing distance.

Alternatively, it is also possible to select other (optical) distances z between the array of filter elements $\beta_{pq}$ and the grid of pixels $\alpha_{ij}$. For most displays (LCD, plasma or other displays), the typical, but not exclusive range for z is about 0.4 mm 25 mm.

In yet another favorable embodiment, the geometric form of all filter elements $\beta_{pq}$ is equal, and the geometric form of all pixels $\alpha_{ij}$ is equal as well; compared to the geometric form of the pixels $\alpha_{ij}$, that of the filter elements $\beta_{pq}$ is smaller or greater in the horizontal and/or vertical direction by a corrective factor f, which is preferably 0.95<f<1.05.

Provided the filter array is arranged in front of the image display device (in viewing direction), the corrective factor f is selected, e.g., by the equation $$f = 1 - \frac{z}{d_a}$$

in which z can be entered as a range as given above, or as a fixed value (e.g., z=2 mm).

For rendering a colored image, pixels $\alpha_{ij}$ adjacent in rows or/and in columns preferably radiate light of different wavelengths or wavelength ranges, for example, red, green or blue light. This includes the possibility, of course, that the image display device is of the RGB type, but monochrome image display devices can be used as well.

Eligible image display devices are, e.g., plasma displays, LC displays, OLEDs, OELDs, laser-based systems and other types, preferably with fixed and defined pixel positions. Image display devices with full-color pixels, such as, e.g., projection displays, can also be used.

As a rule, the propagation directions for the light radiated by the pixels $\square_{ij}$ are established as wavelength-dependent propagation directions.

BRIEF DESCRIPTION OF THE DRAWINGS

Below, the invention is described in detail with reference to the accompanying drawings, in which FIG. 2 shows the image combination rule for generating the image to be presented by the pixels of the image display device according to the first embodiment example, FIG. 7 shows the image combination rule for generating the image to be presented by the pixels of the image display device according to the second embodiment example, FIG. 12 shows the image combination rule for generating the image to be presented by the pixels of the image display device according to the third embodiment example, FIG. 17 shows the image combination rule for generating the image to be presented by the pixels of the image display device according to the fourth embodiment example, FIG. 22 shows the image combination rule for generating the image to be presented by the pixels of the image display device according to the fifth embodiment example.

For the sake of clarity, the drawings are not to scale, as a rule, and they show only parts of the respective total views.

DETAILED DESCRIPTION OF THE INVENTION

Let us assume that all embodiment examples described here are provided with exactly one filter array, which is arranged at a distance z in front of the image display device as seen in the viewing direction. Let us further assume that the image display device in all embodiments is, for example, a 15" TFT-LCD made by LG, and has a pixel pitch of 0.3 mm×0.3 mm (RGB triplet).

Figure 1:
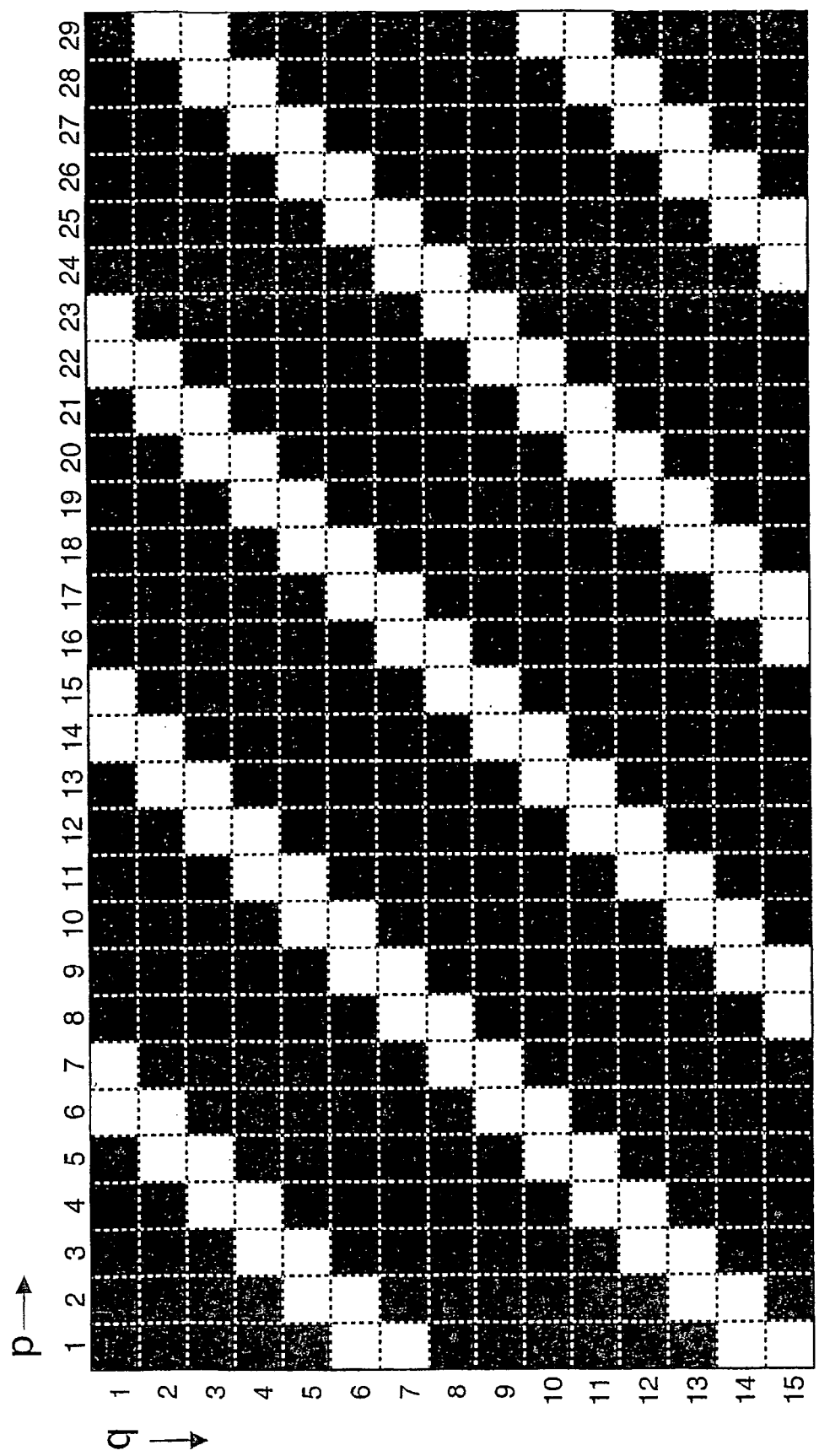
FIG. 1 shows the filter array of a first embodiment example in arrangements according to the invention.

FIG. 1 shows the filter array of the first embodiment example of arrangements according to the invention, in which $b_{max}=4$ transmission wavelength ranges are provided, the first of which ($\lambda_1$) being essentially transparent to visible light, and the other transmission wavelength ranges ($\lambda_2$, $\lambda_4$) being essentially opaque to visible light. The said filter array has, for example, dimensions of 310 mm (width)×235 mm (height). The broken lines in FIG. 1 are merely intended to make the individual filter elements of the grid (p,q) visible; they do not physically exist on the actual filter array.

The pixels $\alpha_{ij}$ used on the image display device are the RGB subpixels, so that a pixel $\alpha_{ij}$ has, for example, the dimensions of 0.1 mm (width)×0.3 mm (height).

Each filter element $\beta_{pq}$ is essentially of the same size as a pixel $\alpha_{ij}$. The exact dimensions are calculated, for example, by means of the equations given herein before. Given the parameters $p_d=65$ mm, $d_a=700$ mm and $s_p=0.1$ mm, the resulting optical distance between the image display device and the filter array $z=1.0786$ mm, and the resulting corrective factor $f=0.9984592$. Hence, each filter element is 0.1 mm*f=0.09984592 mm wide and 0.3 mm*f=0.2995377 mm high. FIG. 1 is based on the matrix $$d_{pq} = \frac{p - \left(IntegerPart\left(\left(\frac{p}{2}+\frac{q}{2}\right)-1\right) \bmod 4 + 1\right)}{q}$$

and on a value $n_m=8$.

Figure 2:
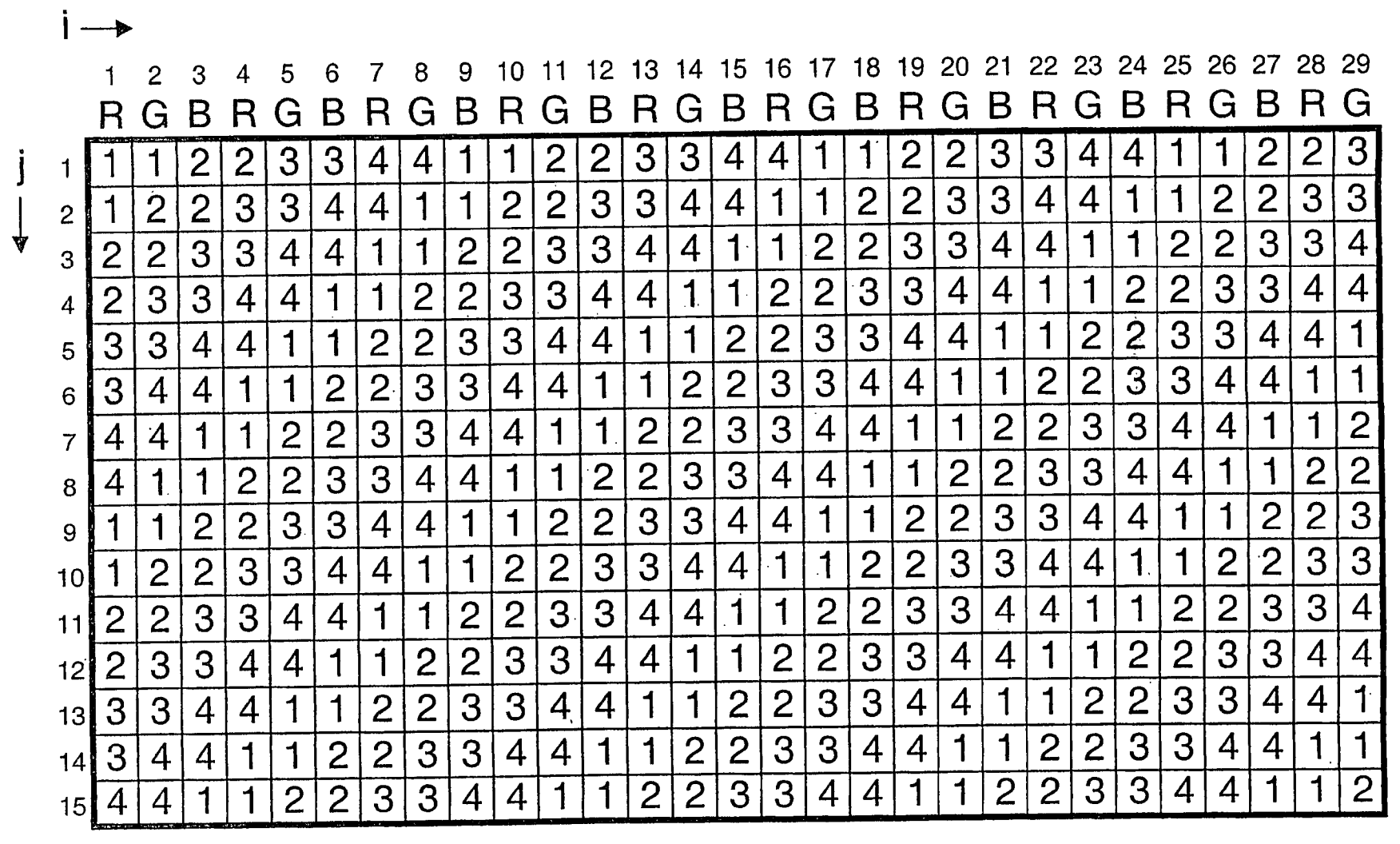

FIG. 2 shows the image combination structure for presenting bits of partial image information from the various views $A_k$ (k=1 . . . n, n=4) on the image display device. This can be generated according to the matrix $c_{ij}=d_{pq}$ described before for (p=i and q=j) and with the parameter n'=8. The views $A_k$ are, for example, perspective views of a scene or object, which have been obtained by means of a camera or a computer, preferably from taking positions slightly shifted relative to each other.

Figure 3:
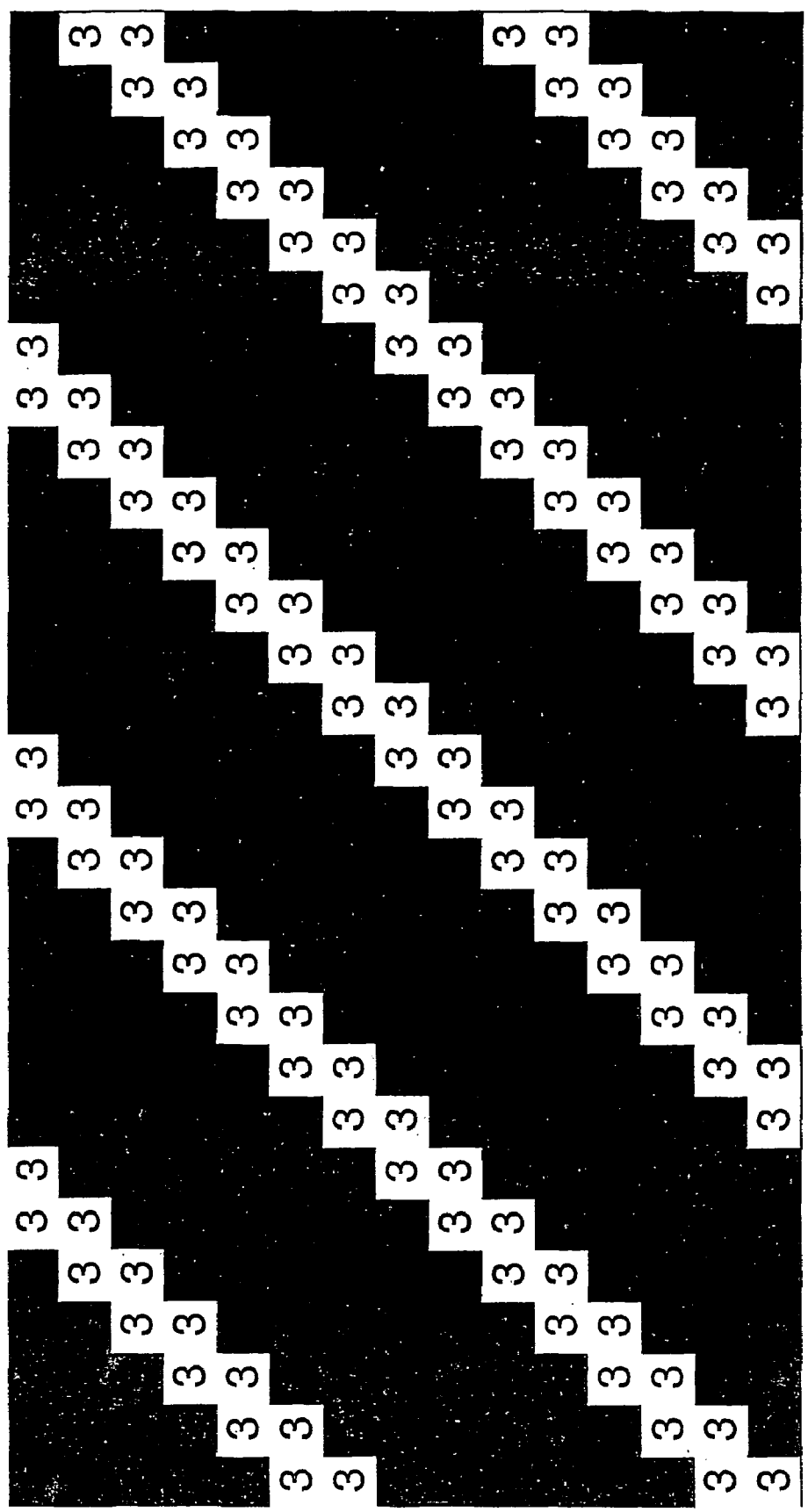
FIGS. 3 through 5 show examples of the image information visible to one of the viewer's eyes according to the first embodiment example.
Figure 4:
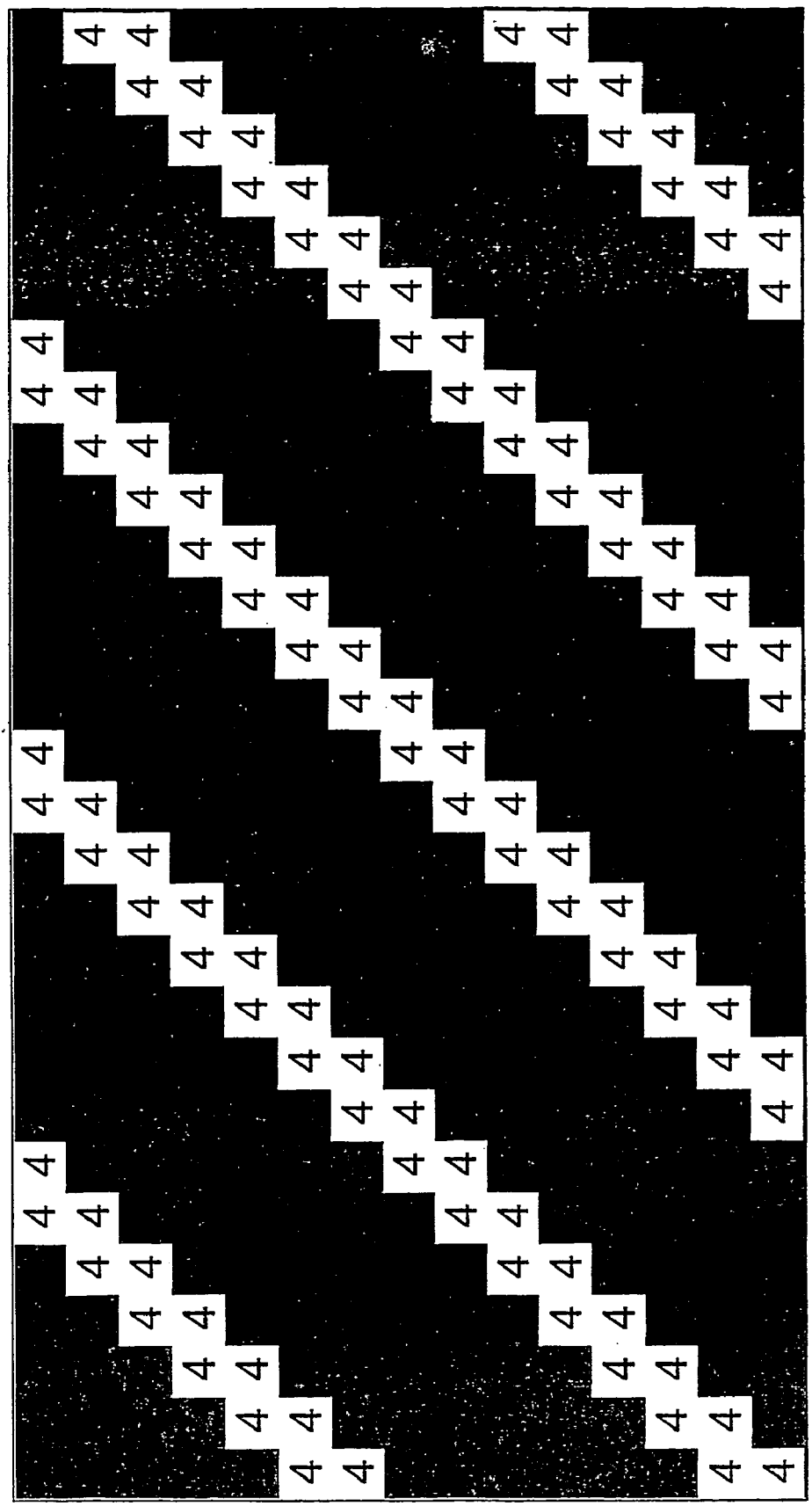

FIGS. 3 and 4 show two examples of the bits of partial image information visible to one of the viewer's eyes from particular viewing positions. Accordingly, what is visible to one of the viewer's eyes from at least two monocular viewing positions are exclusively (or almost exclusively) bits of partial image information from a single view $A_k$. If the eye positions are the positions of the viewer's two eyes, the viewer sees a spatial image with improved 3D image quality (depth).

There also exist a great number of viewing positions from which essentially bits of partial image information from several different views $A_k$ are simultaneously visible to both of the viewer's eyes, each monocularly seeing predominantly bits of partial image information from different views, so that the scene or object shown also appear to be spatial to the viewer. A possible combination of bits of partial image information from different views (here, views $A_3$ and $A_4$) visible to one of the viewer's eyes is shown in FIG. 5.

Figure 5:
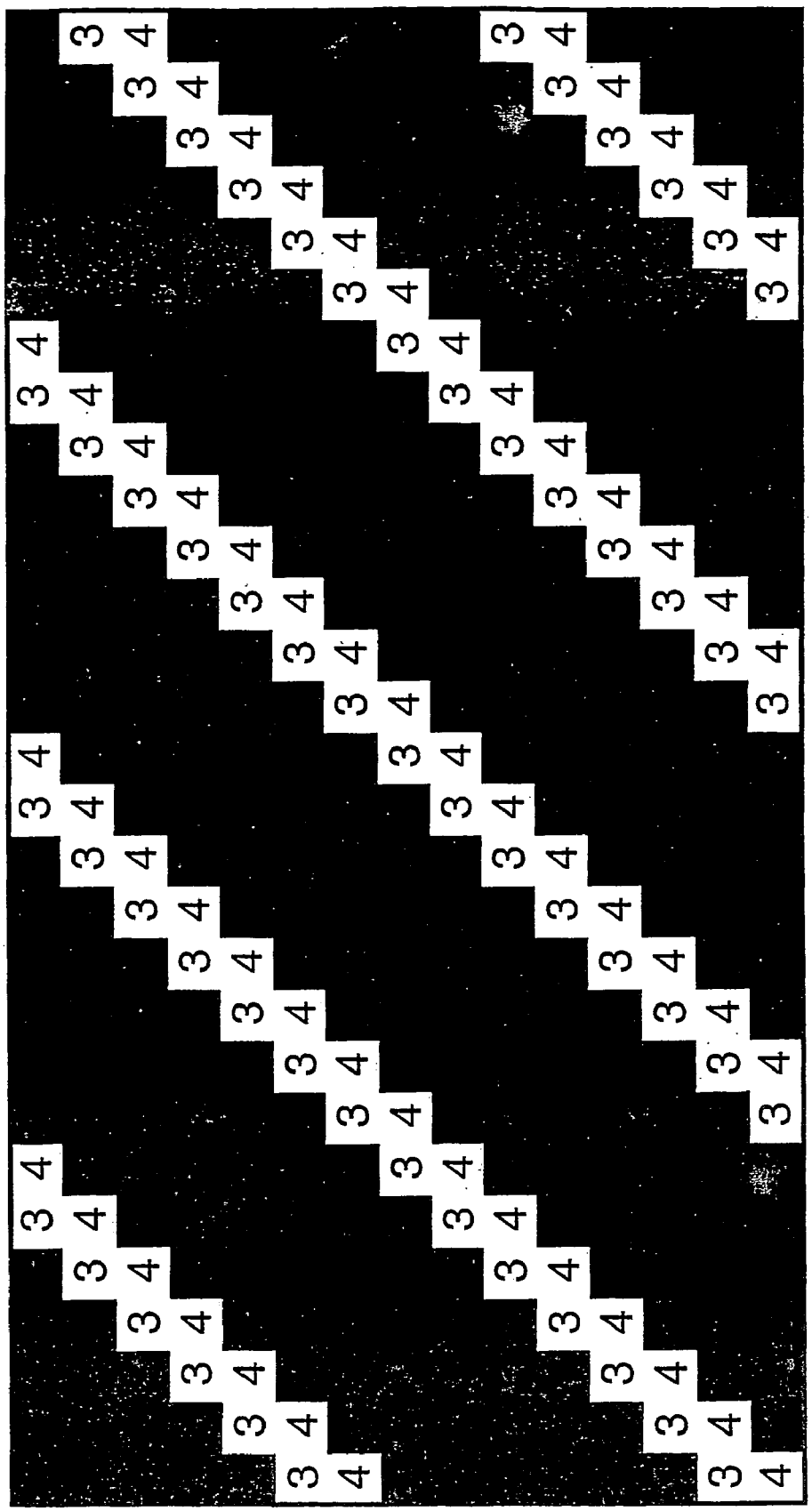

In the embodiment example with 4 views (n=4) described so far, bits of partial image information from at least two views $A_k$ are inherently made visible to one of the viewer's eyes from a number of monocular viewing positions in the space in front of the arrangement according to the invention, with at least one fifth of the visible pixels $\alpha_{ij}$ being essentially completely visible to the respective eye of the viewer (see FIG. 5, in which case all visible pixels are completely visible at the same time). Thus, what is visible to one of the viewer's eyes from some first viewing positions is essentially partial image information from exactly one view $A_k$, whereas, from other (second) viewing positions, one of the viewer's eyes will see images that are mixes of bits of partial image information from several views $A_k$. These mixed images may be the result (1) of the shift of the respective eye from the first to the second viewing positions in the plane parallel to the plane of the pixels (the eye position shown in FIG. 5, for example, is shifted relative to that shown in FIG. 4 by approximately half an interpupillary distance), or also (2) of a position change of the respective eye as regards its distance from the plane of the pixels.

Figure 6:
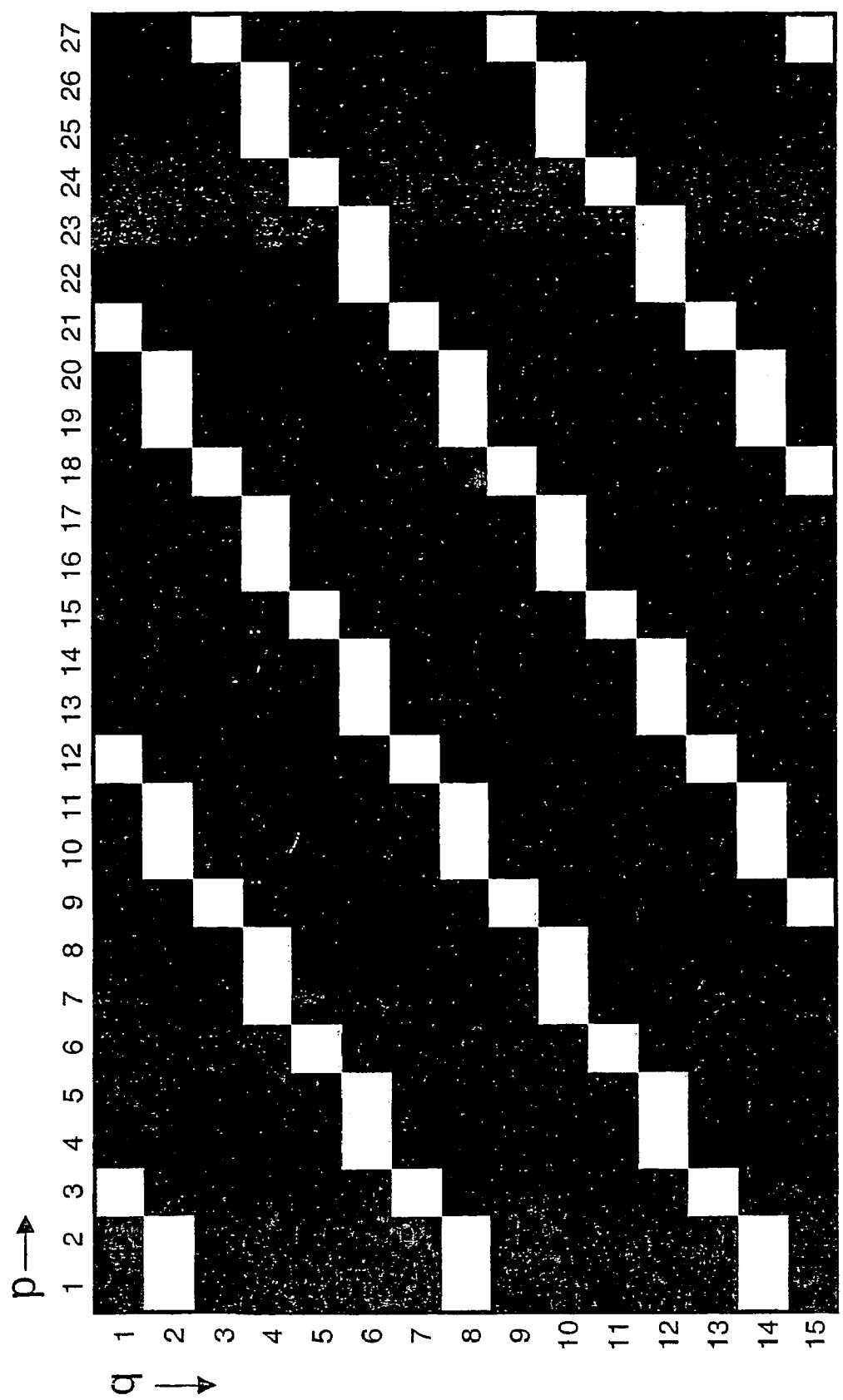
FIG. 6 shows the filter array of a second embodiment example of arrangements according to the invention.
Figure 7:
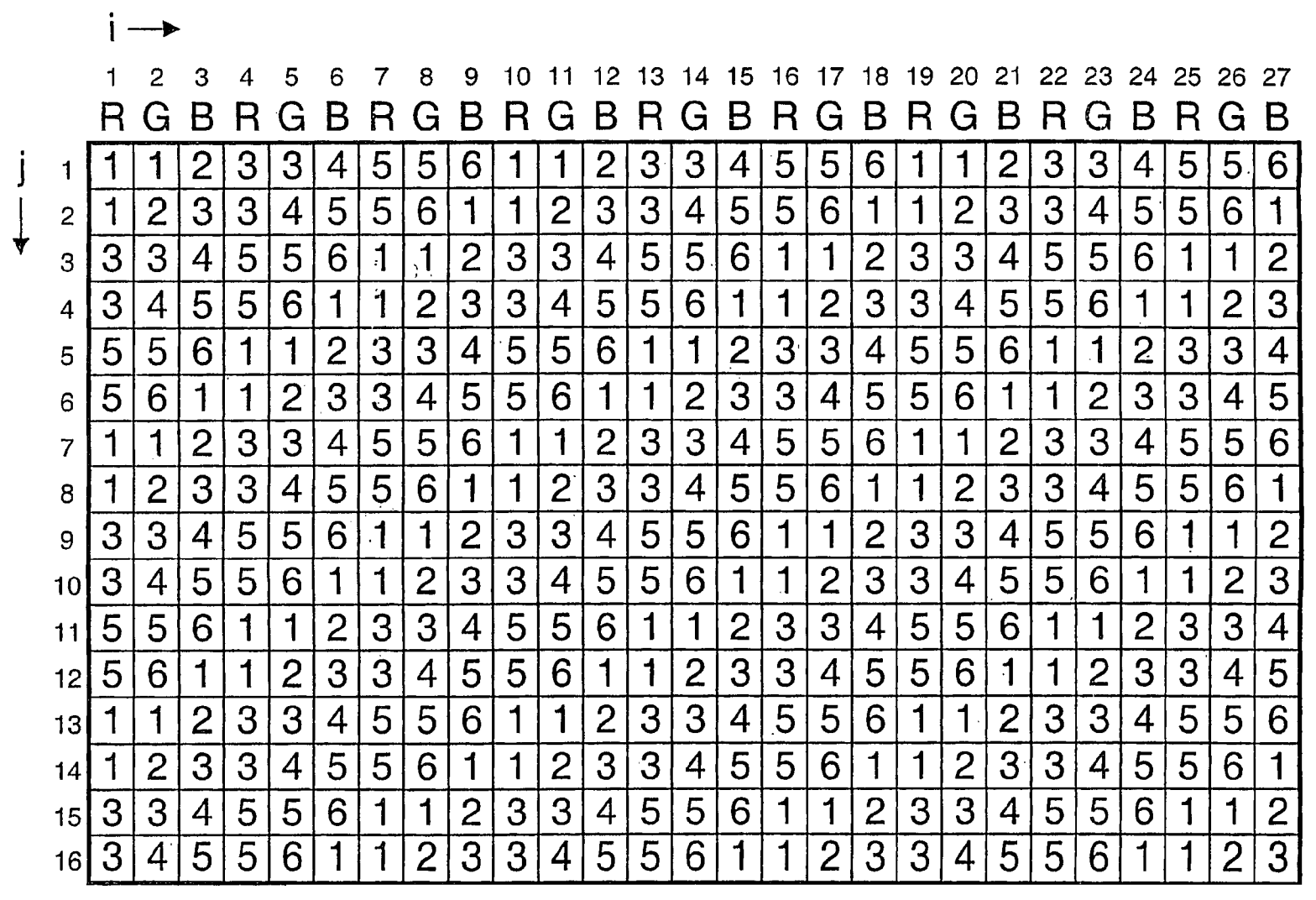
Figure 8:
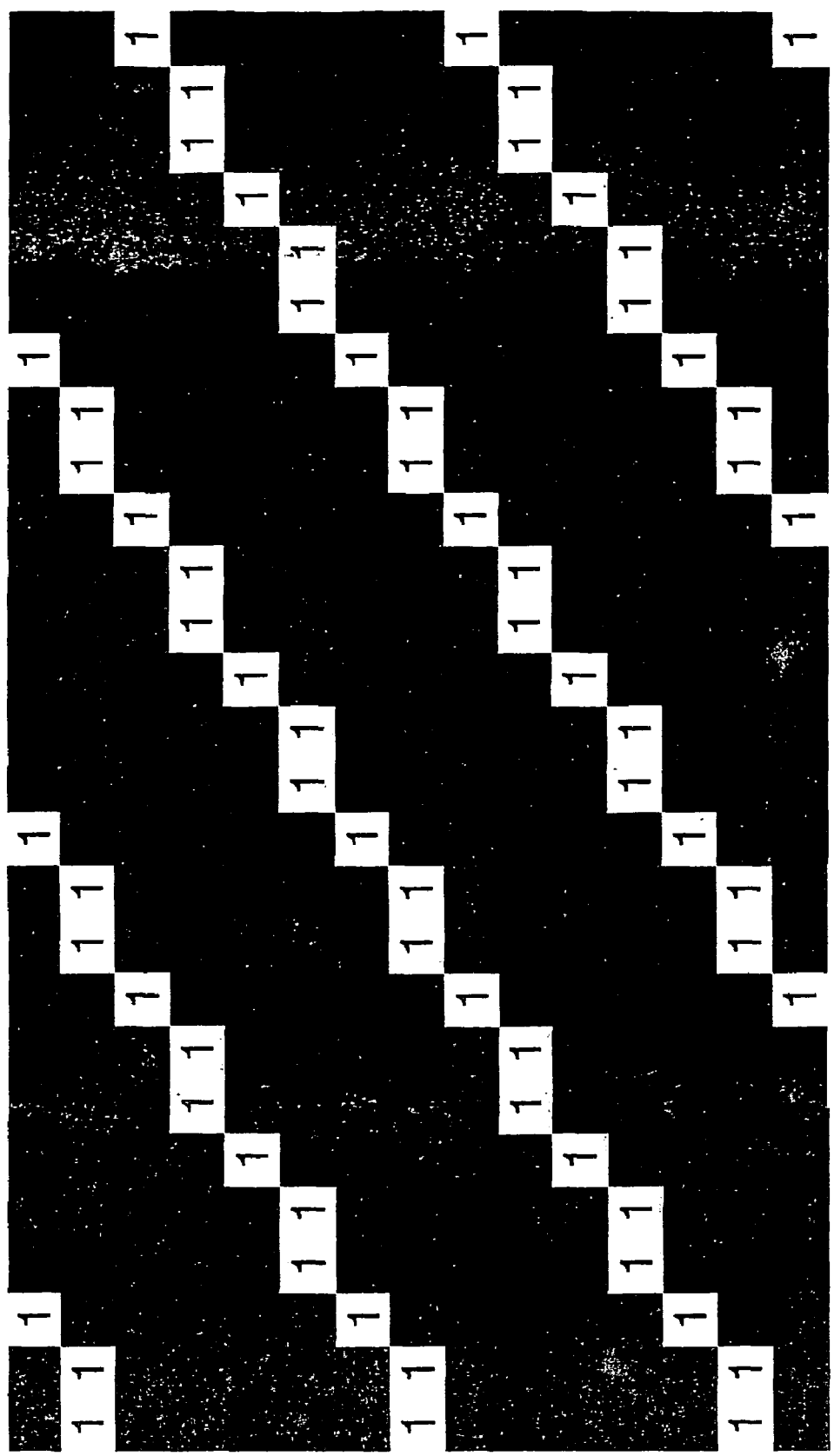
FIGS. 8 through 10 show examples of the image information visible to one of the viewer's eyes according to the second embodiment example.
Figure 9:
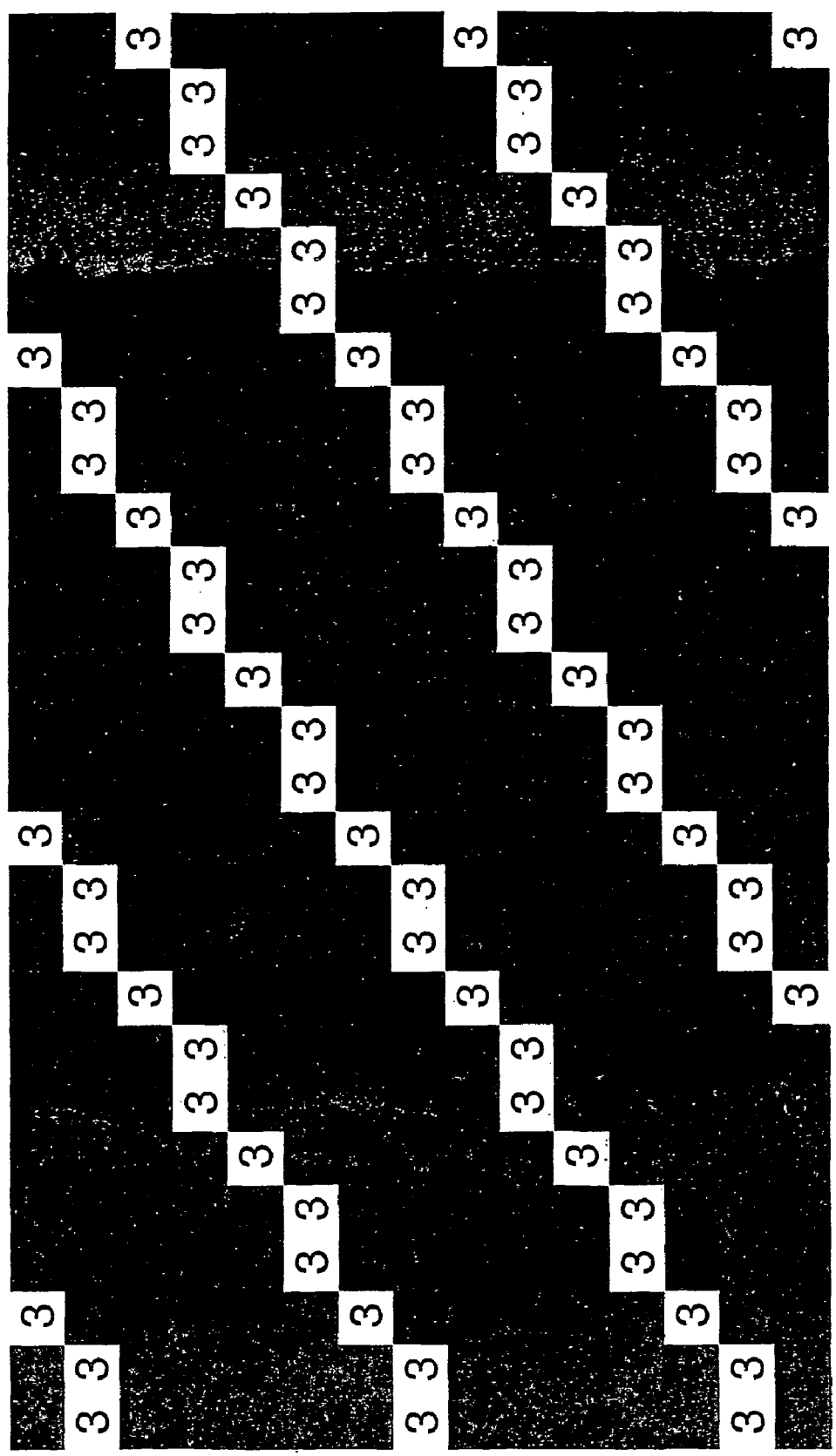
Figure 10:
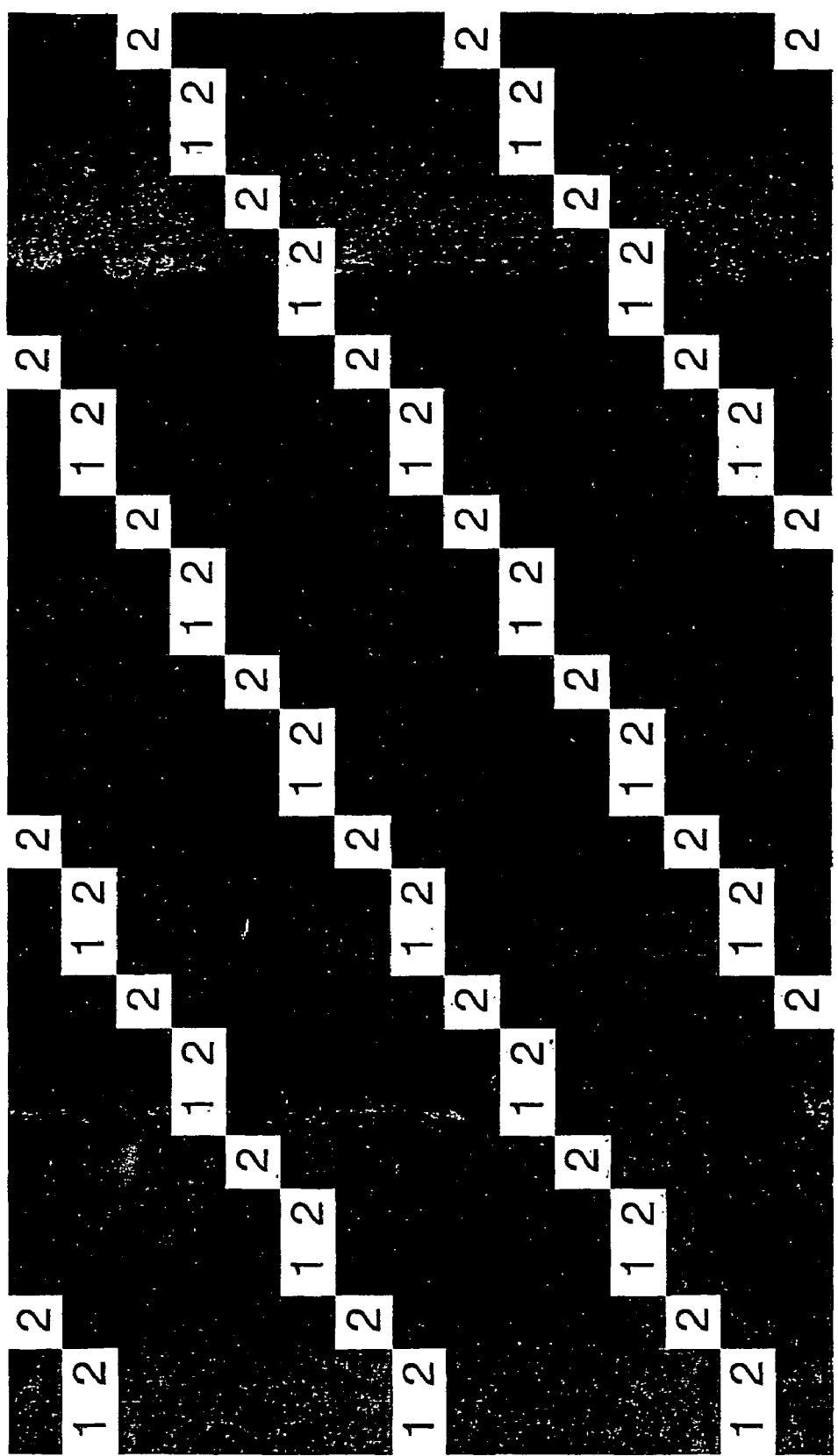

A second embodiment example based on n=6 views is shown in FIGS. 6 through 10; the descriptions for FIGS. 1, 2, etc. applying analogously and respectively to FIGS. 6, 7, etc. The two embodiments differ mainly in that, on the filter array shown in FIG. 6, not every filter element $\beta_{pq}$ that is essentially transparent to visible light borders on at least one other filter element $\beta_{pq}$ essentially transparent to visible light in at least one row and/or in at least one column, and that $d_{pq}$ and $c_{ij}$ are neither identical nor selected in such a way that $b(p,q)=k(i,j)$ would apply to all pairs (p=i, q=j). Here, the matrices $d_{pq}$ and $c_{ij}$ are not given explicitly. Furthermore, the individual filter elements in FIG. 6 are not indicated by broken lines.

For the series of drawings FIGS. 11 through 15 (third embodiment example), FIGS. 16 through 20 (fourth embodiment example), and FIGS. 21 through 25 (fifth embodiment example), the descriptions for FIGS. 1 through 5 (in this order) are relevant again.

Figure 11:
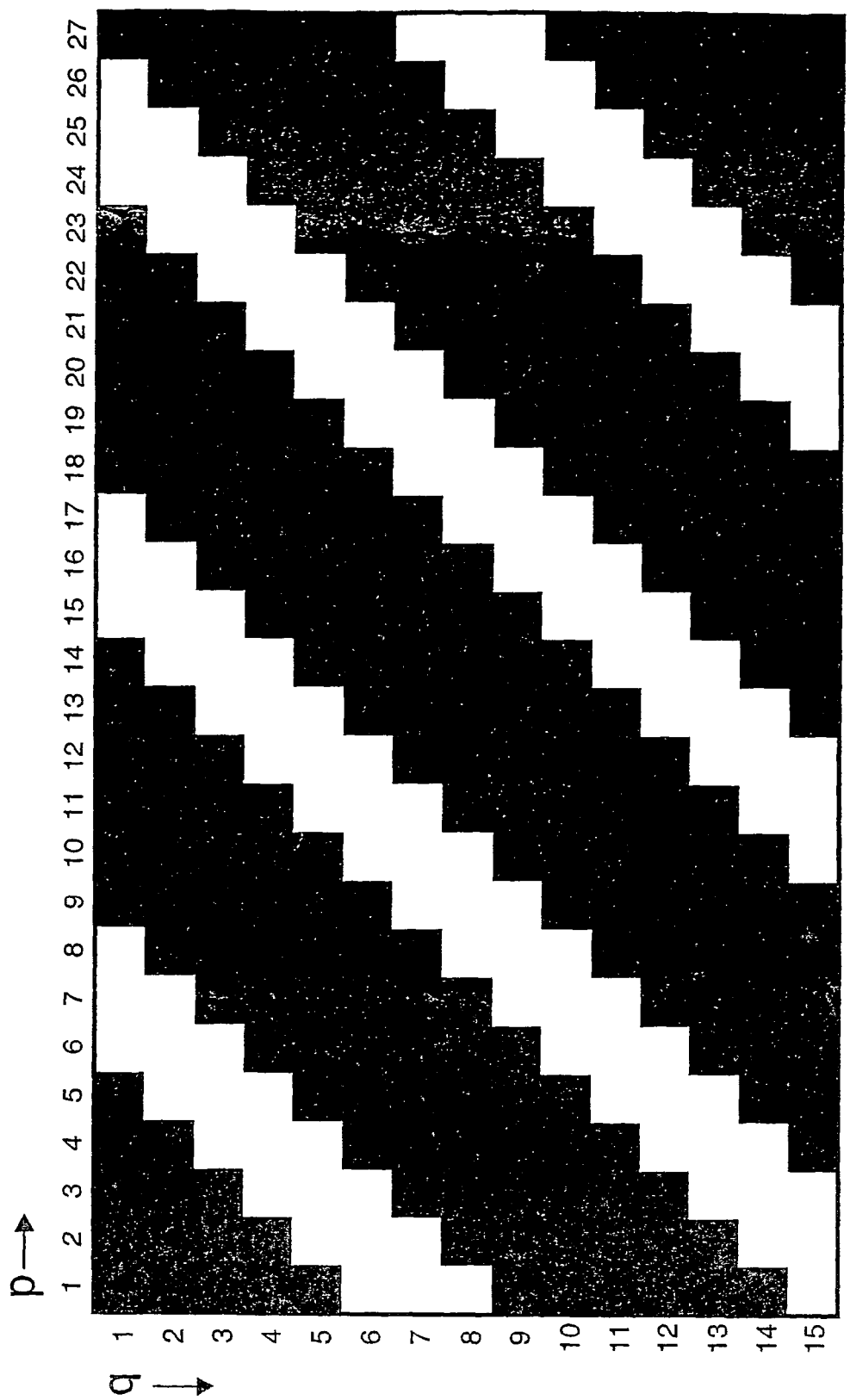
FIG. 11 shows the filter array of a third embodiment example of arrangements according to the invention.
Figure 13:
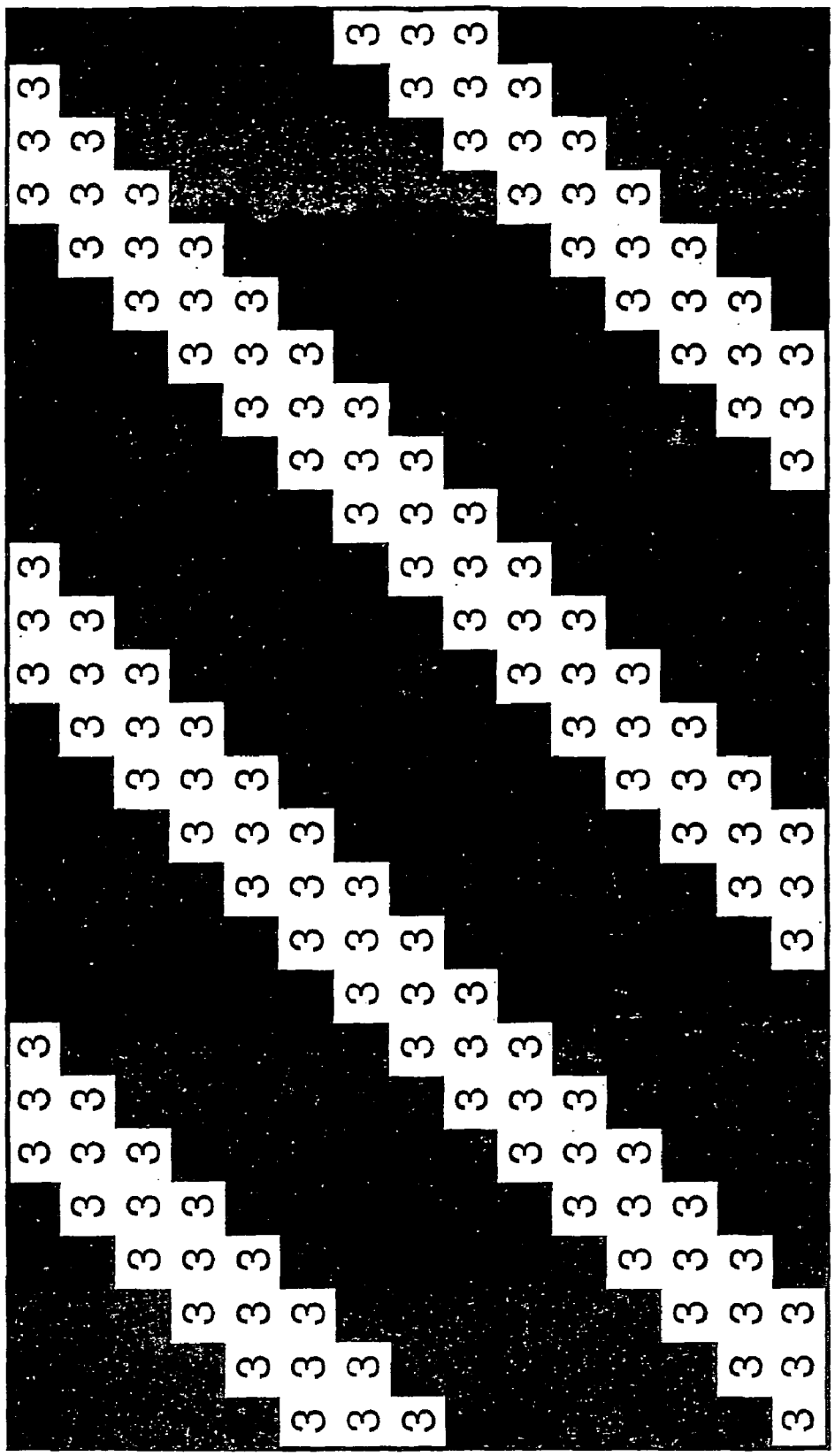
FIGS. 13 through 15 show examples of the image information visible to one of the viewer's eyes according to the third embodiment example.
Figure 14:
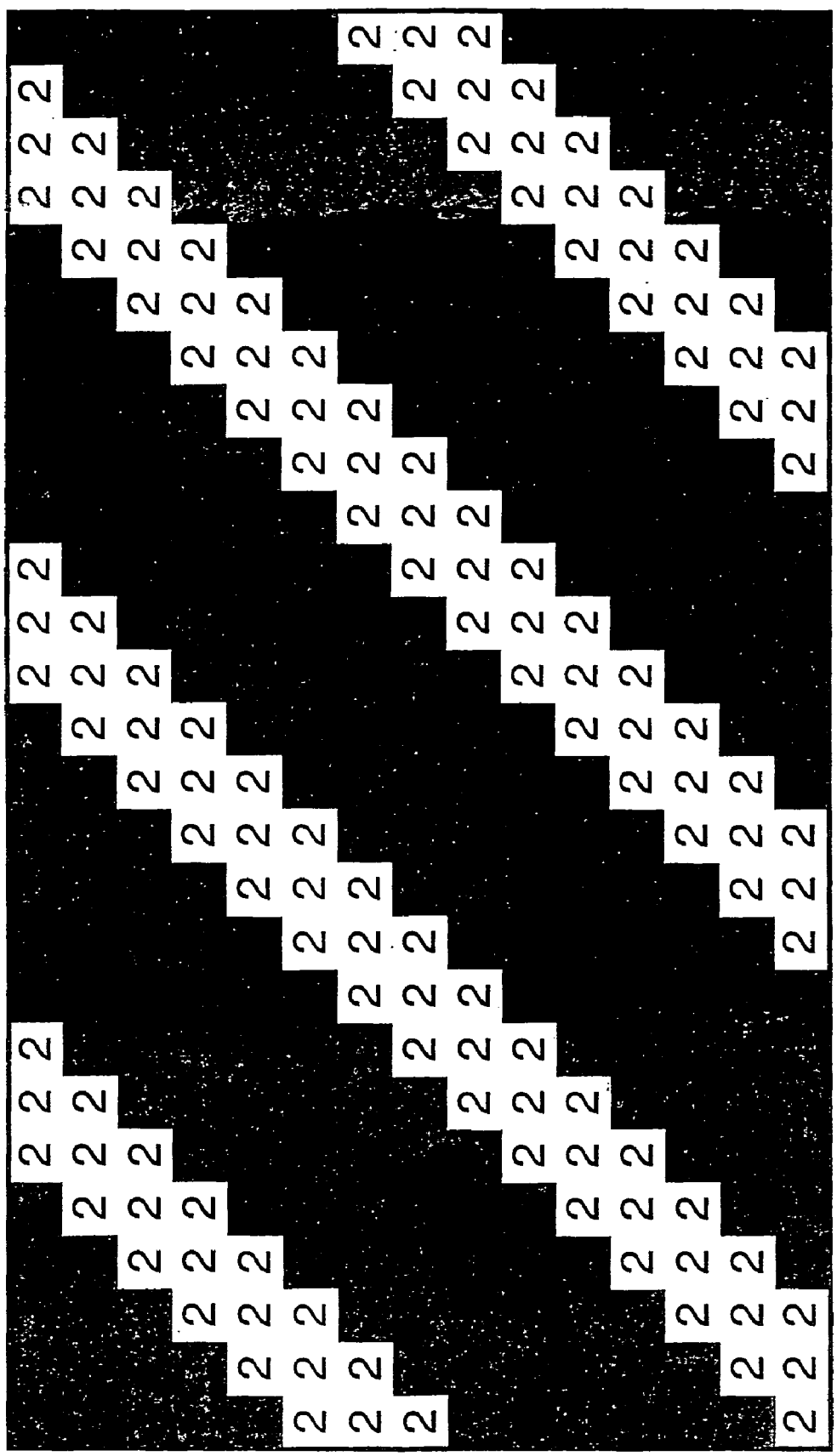
Figure 15:
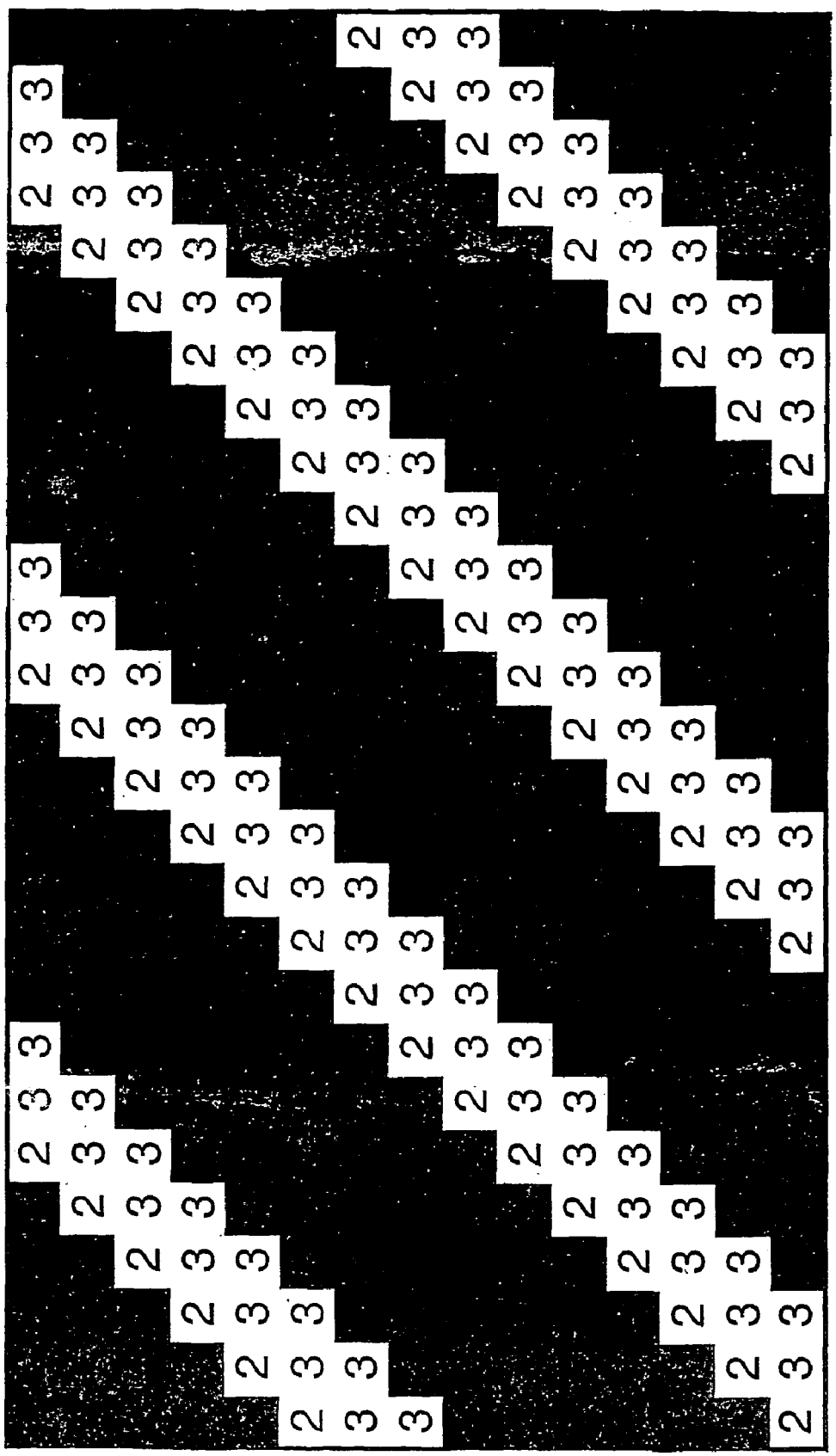
Figure 16:
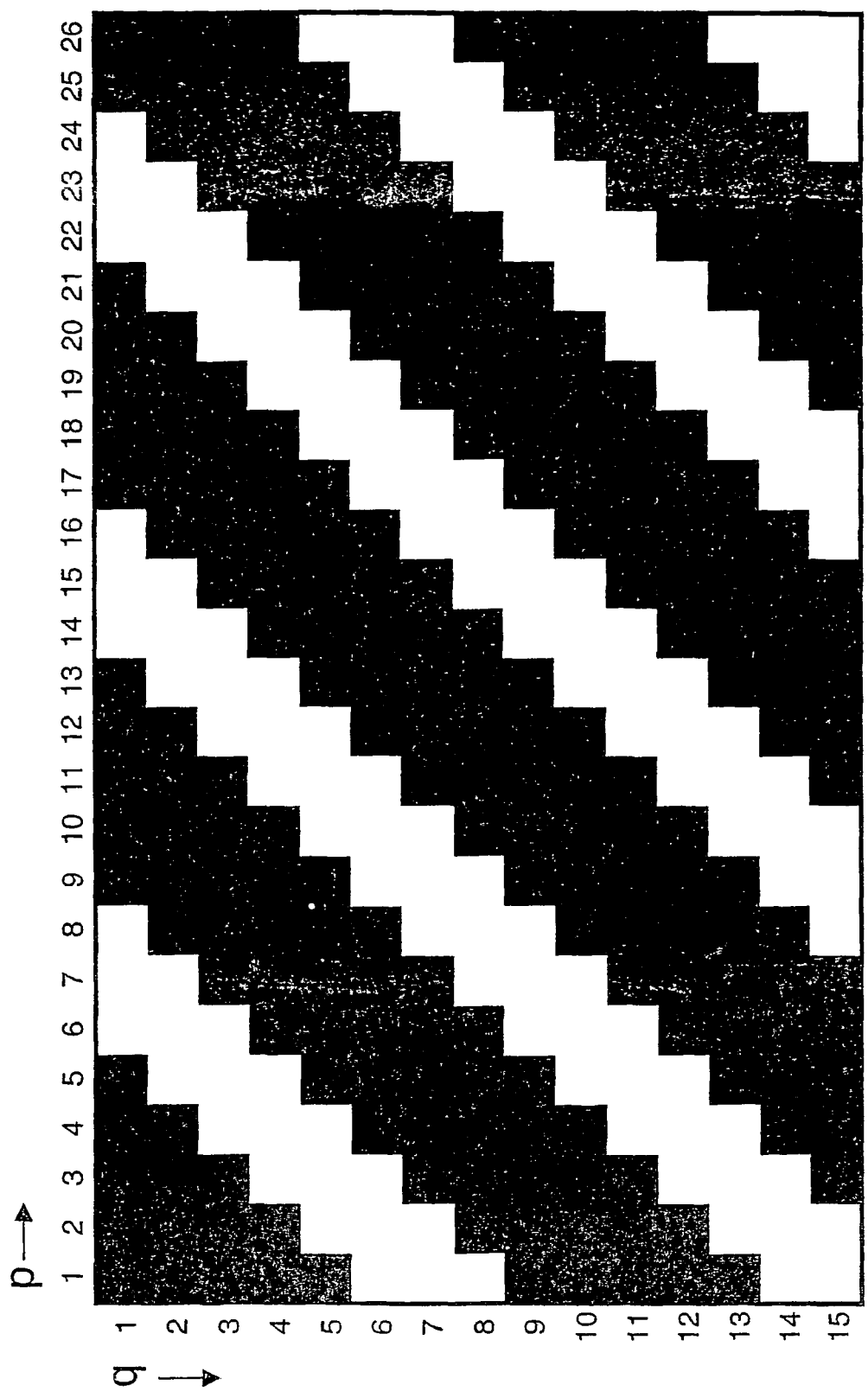
FIG. 16 shows the filter array of a fourth embodiment example of arrangements according to the invention.
Figure 18:
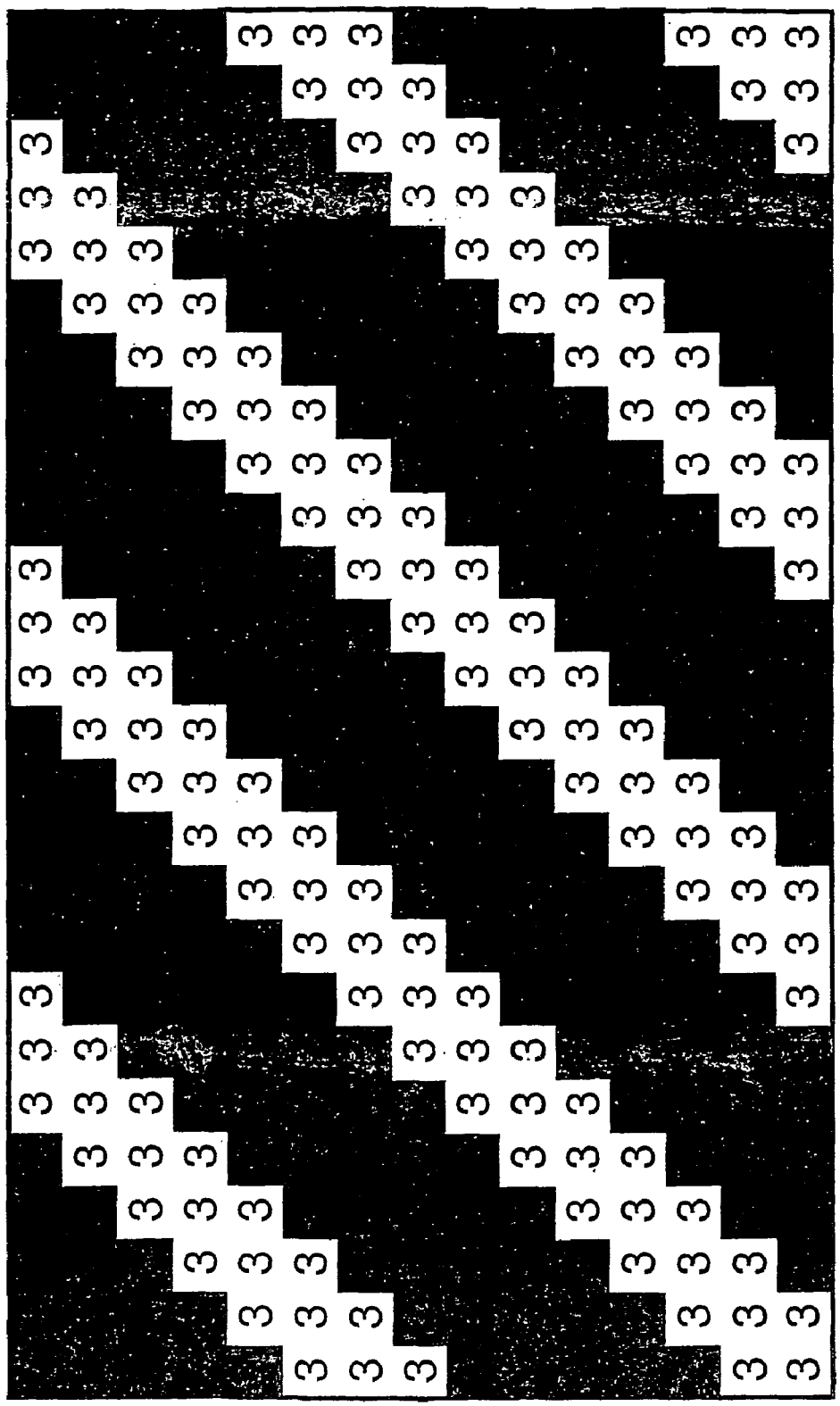
FIGS. 18 through 20 show examples of the image information visible to one of the viewer's eyes according to the fourth embodiment example.
Figure 19:
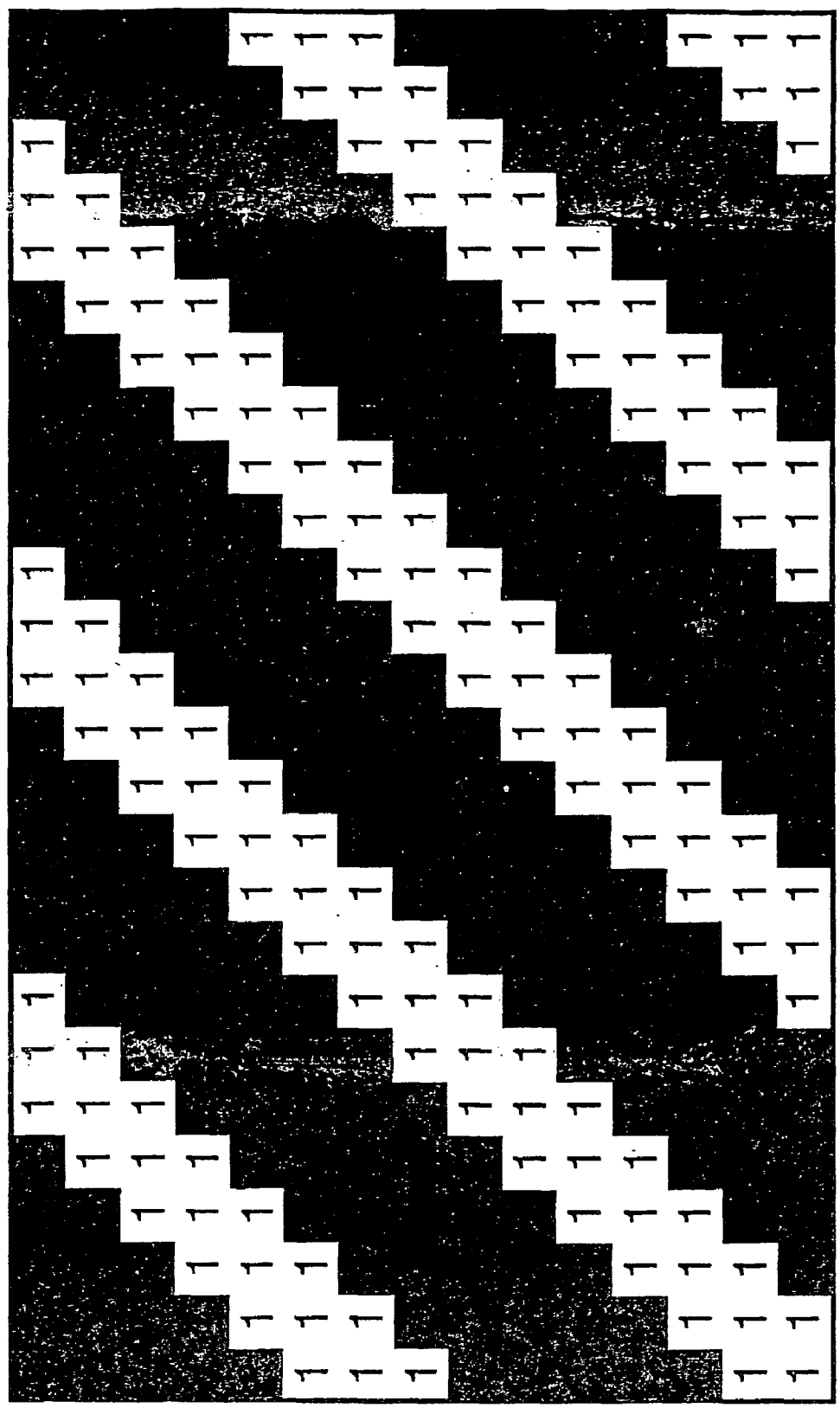
Figure 20:
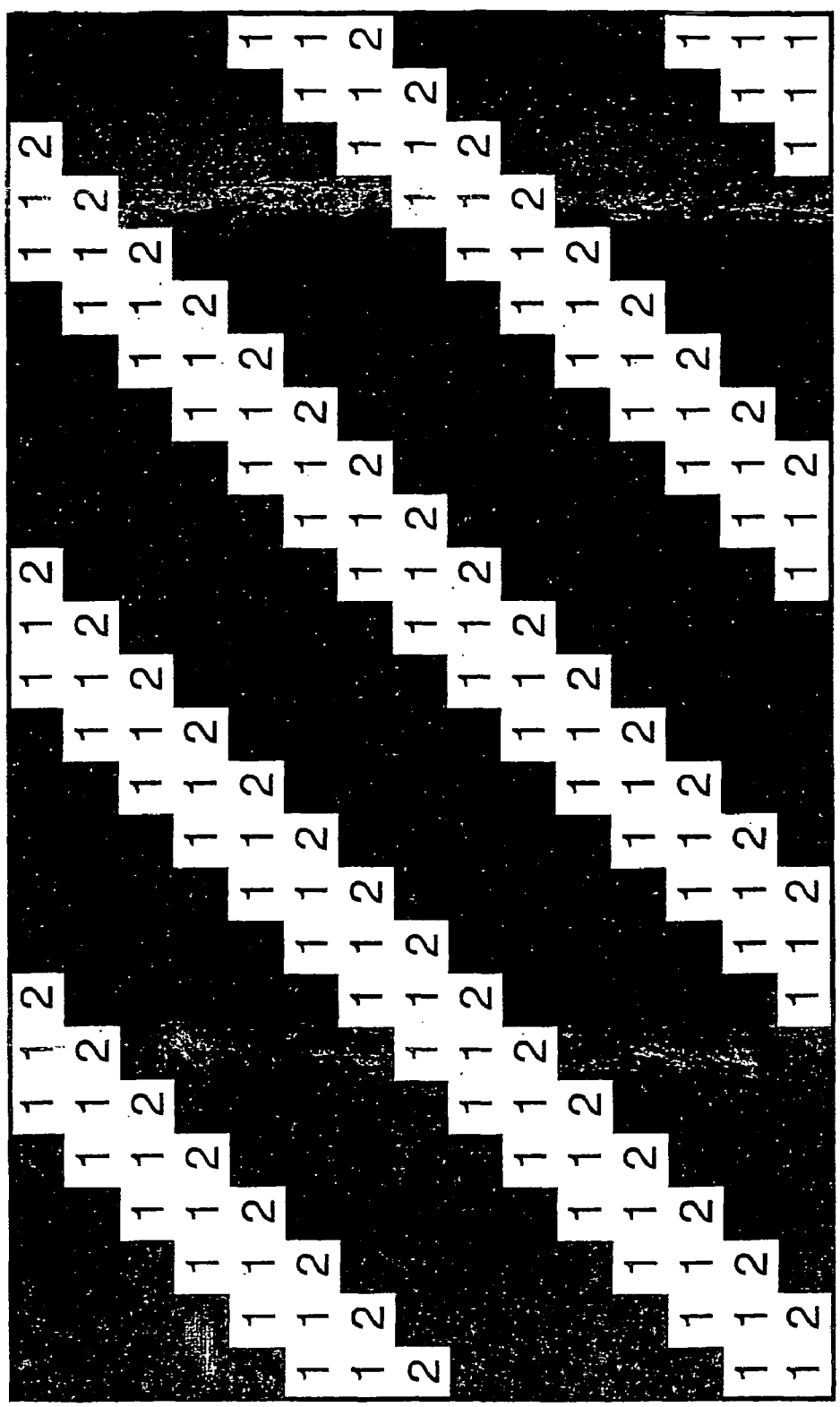
Figure 21:
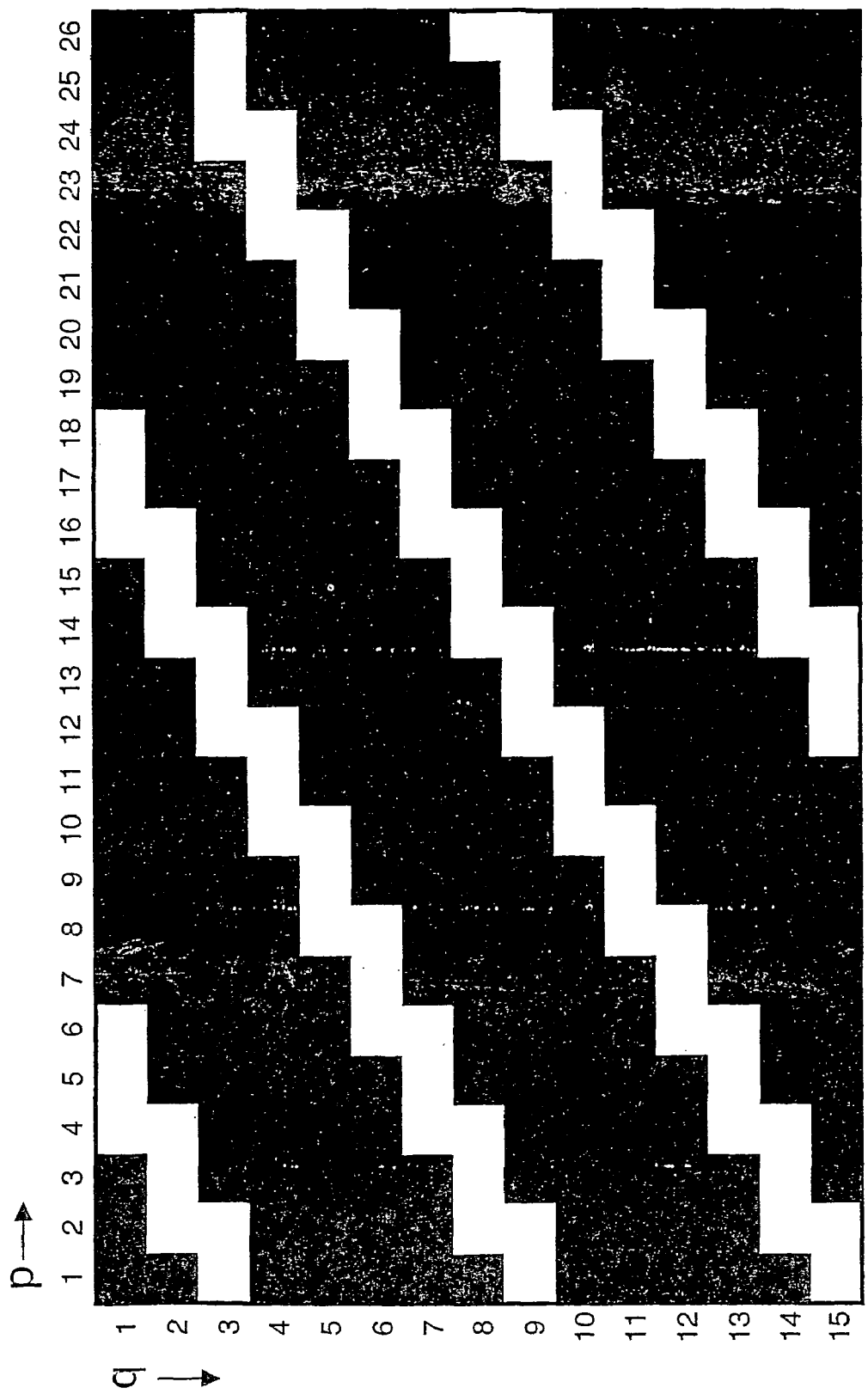
FIG. 21 shows the filter array of a fifth embodiment example of arrangements according to the invention.
Figure 23:
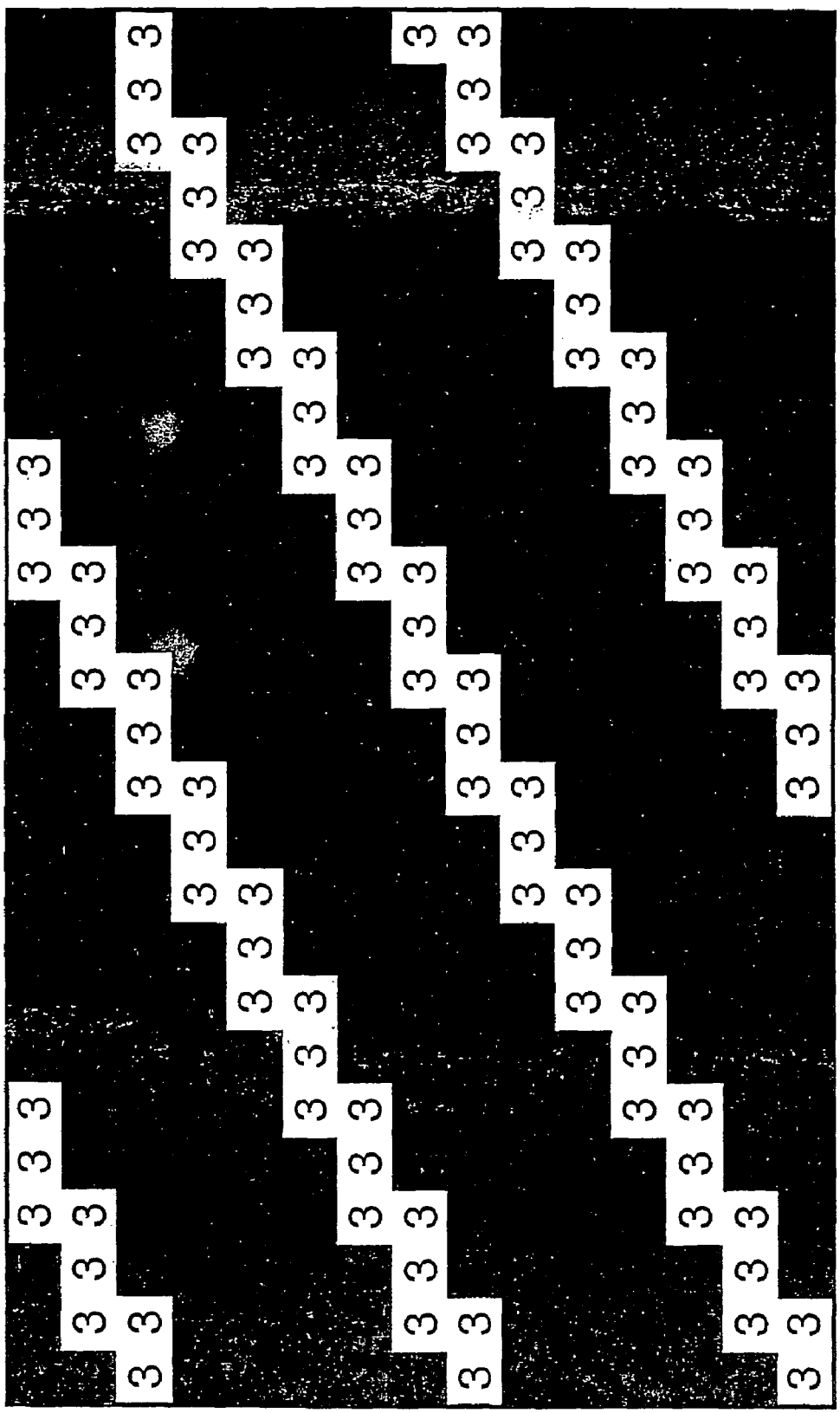
FIGS. 23 through 25 show examples of the image information visible to one of the viewer's eyes according to the fifth embodiment example.
Figure 24:
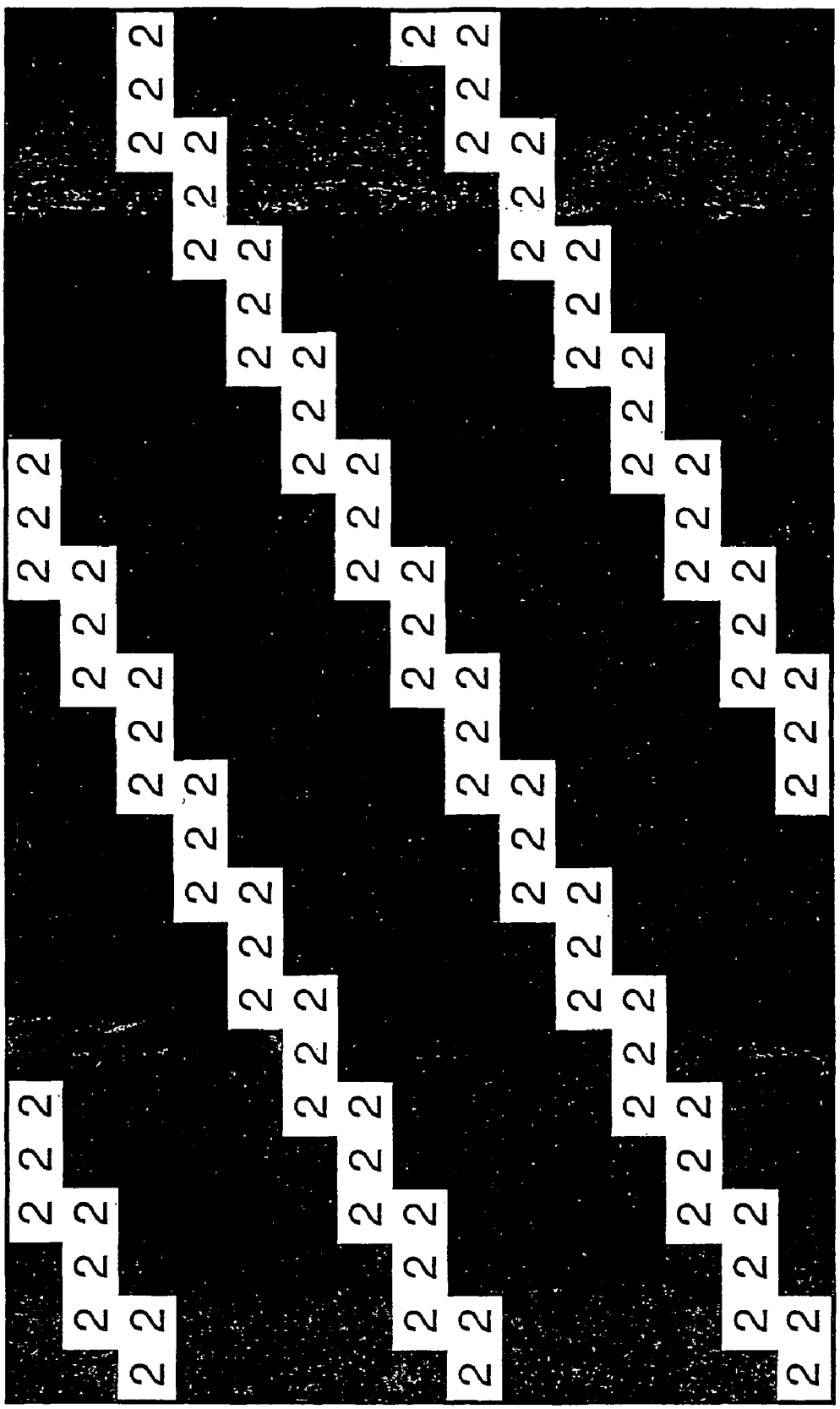
Figure 25:
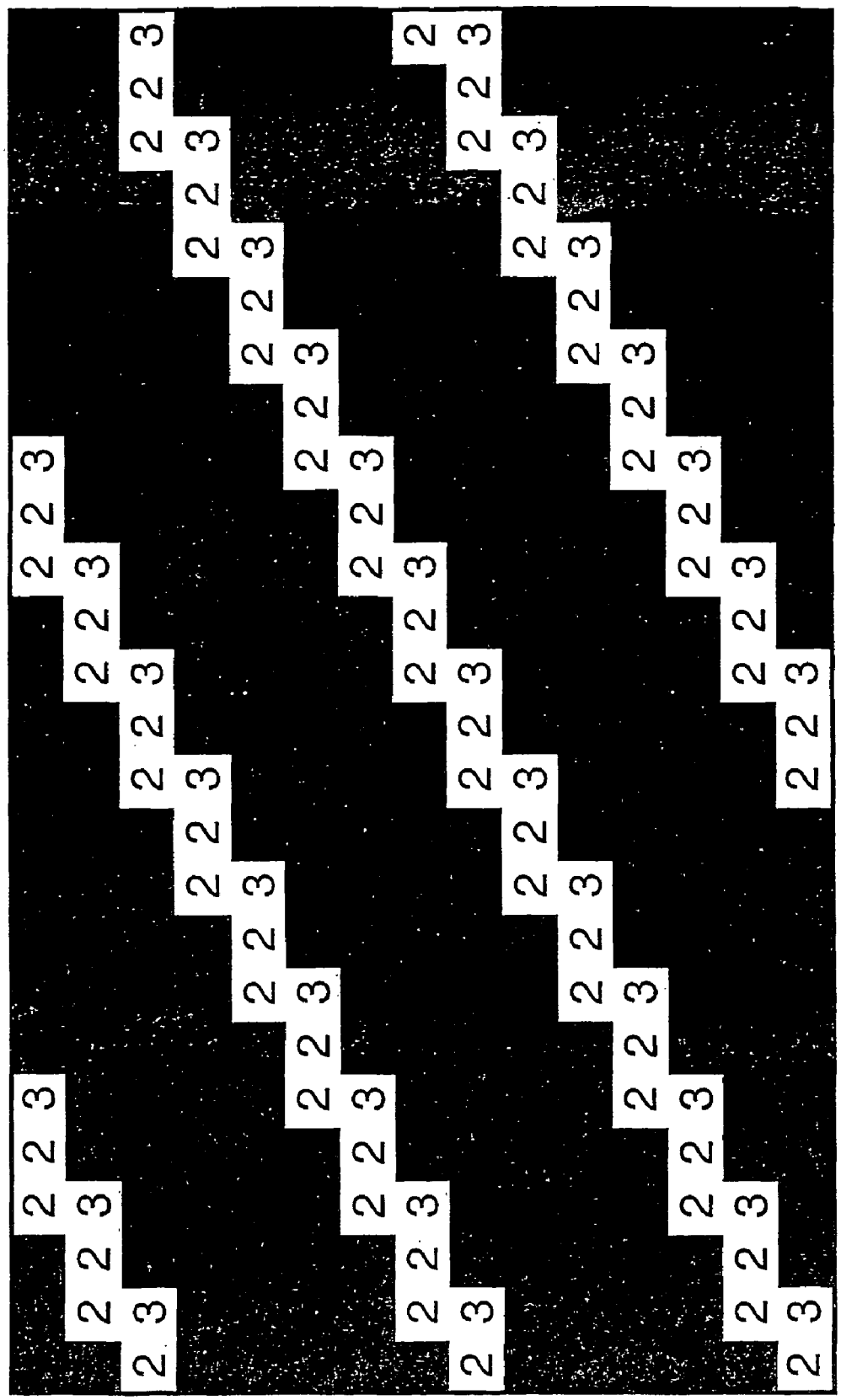

Here again, the matrices $d_{pq}$ and $c_{ij}$ are not given explicitly either; nor are they identical to those given for the first embodiment example. In FIGS. 11, 16 and 21, the individual filter elements are not indicated by broken lines either.

Figure 26:
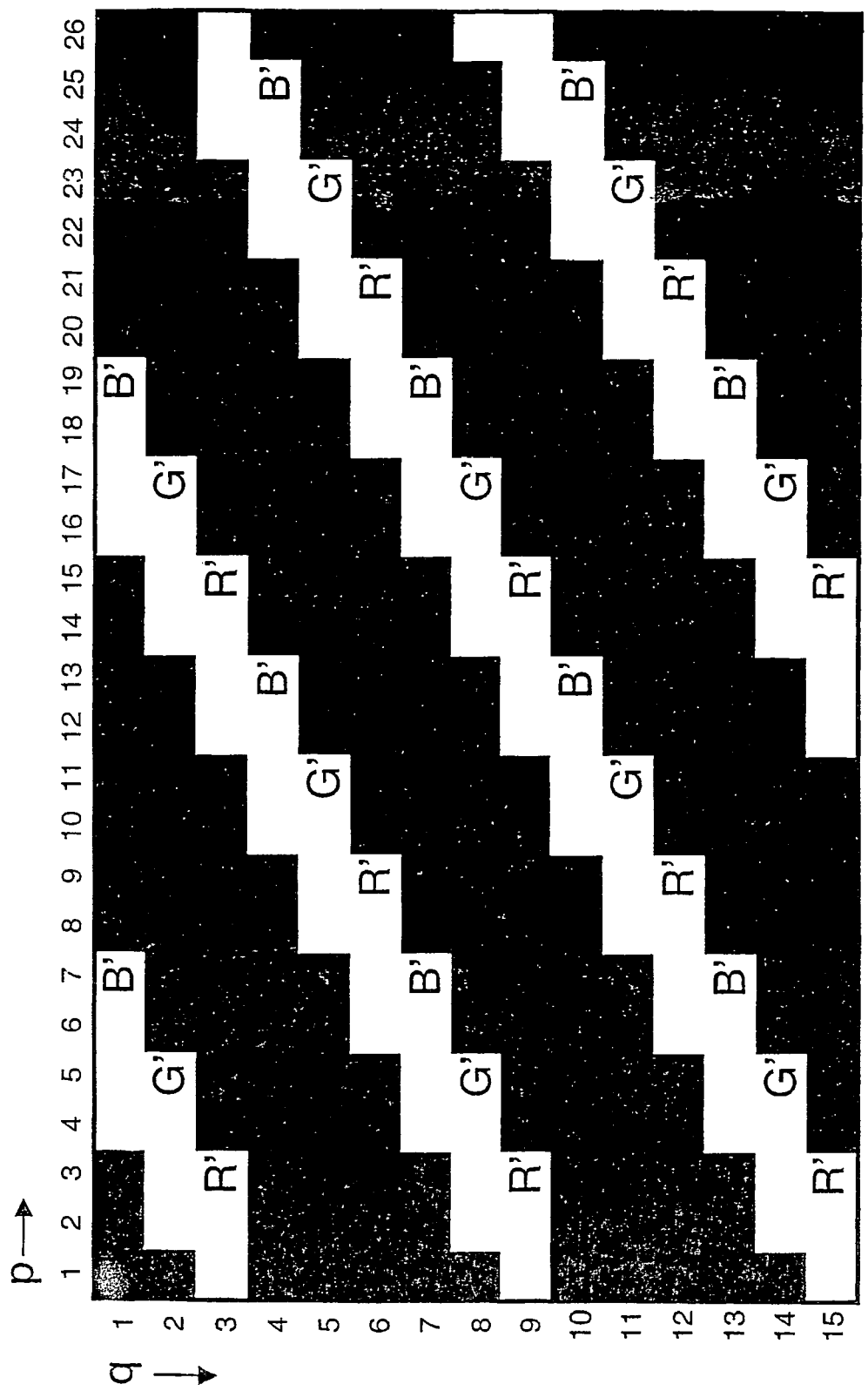
FIG. 26 shows the filter array of a sixth embodiment example of arrangements according to the invention.

FIG. 26 shows the filter array of a sixth embodiment example, which, among others, comprises red, blue and green transmission wavelength ranges $\lambda_b$, in addition.

A filter array can be manufactured, for example, as a sheet of exposed and developed photographic film laminated onto a carrier substrate (e.g., of glass). Other manufacturing methods are also feasible, of course.

Additionally, arrangements according to the invention can be provided with a component for optional switching between a 2D mode and a 3D mode. This is possible especially if the filter array is provided (in viewing direction) behind the (translucent) image display device such as, e.g., an LC display. Behind the filter array there is a light source, and between the LC display and the filter array there is an electrically switchable diffusion disk that can be switched to be transparent in the 3D mode, and diffusing in the 2D mode. The diffusion cancels the light propagation directions established, so that, in the 2D mode, a largely homogeneous illumination of the LC display is achieved. Other versions for switching between 2D and 3D modes can also be implemented in arrangements according to the invention.

In special application cases, it may be advantageous to use several filter arrays.

The invention offers the advantage of providing an improved 3D image quality, since, especially from many viewing positions, it ensures good channel separation between the various views seen by the viewer's eyes.

What is claimed is:

1. An arrangement for spatial display, comprising:
   an image display device with a great number of pixels ($\alpha_{ij}$) in a grid of columns (i) and rows (j), on which partial image information from different views ($A_k$ with k= 1 . . . n, n>1) of a scene or object can be displayed,
   at least one filter array arranged (in viewing direction) in front of or behind the image display device and consisting of a great number of filter elements ($\beta_{pq}$) arranged in a grid of rows (q) and columns (p) and transmitting light of particular wavelength ranges and/or with particular transmittances ($\lambda_b$), in which each filter element ($\beta_{pq}$) has substantially the size of a pixel ($\alpha_{ij}$), and in which a great number of the filter elements ($\beta_{pq}$) are substantially opaque and a great number are substantially transparent to visible light, so that propagation directions for the light radiated by the pixels $\alpha_{ij}$ are established,
   in which bits of partial image information from the views ($A_k$) (k=1 . . . n) are assigned to pixels ($\alpha_{ij}$) of position (i,j) according to the equation $$k = i - c_{ij} \cdot j - n' \cdot IntegerPart\left[\frac{i - c_{ij} \cdot j - 1}{n'}\right],$$

where
   (k) is the consecutive number of the view ($A_k$) (k=1 . . . n) from which the bit of partial information to be rendered on a particular pixel $\alpha_{ij}$ originates,
   (n) is the total number of views ($A_k$) (k=1 . . . n) employed,
   (n') is a selectable integral number greater than zero,
   ($c_{ij}$) is a selectable coefficient matrix for combining or mixing on the grid the various bits of partial information originating from the views ($A_k$) with (k=1 . . . n), and
   IntegerPart is a function for generating the greatest integral number that does not exceed the argument put in square brackets,
in which
   the filter elements ($\beta_{pq}$), depending on their transmission wavelength range and/or transmittance ($\lambda_b$), are arranged on the grid of rows (q) and columns (p) according to the following equation:

$$b = p - d_{pq} \cdot q - n_m \cdot IntegerPart\left[\frac{p - d_{pq} \cdot q - 1}{n_m}\right],$$

where
   (b) is an integral number that, for a filter element ($\beta_{pq}$) in the position (p,q), defines one of the intended transmission wavelength ranges and/or transmittances ($\lambda_b$), and that may adopt values between 1 and ($b_{max}$),
   ($n_m$) is an integral number greater than zero that preferably corresponds to the integral number (n'),
   ($d_{pq}$) is a selectable mask coefficient matrix for varying the generation of a mask image, and
   IntegerPart is a function for generating the greatest integral number that does not exceed the argument put in square brackets, and, in which
   the selectable mask coefficient matrix ($d_{pq}$) is determined according to the following equation:

$$d_{pq} = \frac{p - \left(IntegerPart\left(\left(\frac{p}{2} + \frac{q}{2}\right) - 1\right) \bmod 4 + 1\right)}{q}, \text{ and}$$

and
   wherein partial image information from different views ($A_k$) is alternatingly displayed by the pixels in less than all rows (j) and column (i) in such a way that, from at least two monocular viewing positions, exclusively or almost exclusively partial image information from a single view ($A_k$) is visible to one of the viewer's eyes, and wherein, from a great number of viewing positions, bits of partial image information from different views ($A_k$) are visible monocularly to both eyes of the viewer, and wherein the viewer has a spatial view of the scene or object displayed.

2. A method for providing a viewer with a spatial display of a scene or object, comprising:
   emitting electromagnetic radiation from an image display device, wherein the image display device has a great number of pixels ($\alpha_{ij}$) arranged in a grid of columns (i) and rows (j);
   establishing propagation directions, for the light radiated by the pixels $\alpha_{ij}$, by a filter array and its great number of filter elements ($\beta_{pq}$) arranged in a grid of rows (q) and columns (p), each of which has substantially the size of a pixel ($\alpha_{ij}$) and wherein a great number of the filter elements ($\beta_{pq}$) are substantially opaque and a great number are substantially transparent to visible light;
   displaying with the image display device, and the filter array arranged in front of or behind the image display device, partial image information from different views ($A_k$ with k=1 . . . n, n>1) of the scene or object;
   assigning bits of partial image information from the views ($A_k$) (k=1 . . . n) to pixels ($\alpha_{ij}$) of position (i,j) according to the equation $$k = i - c_{ij} \cdot j - n' \cdot IntegerPart\left[\frac{i - c_{ij} \cdot j - 1}{n'}\right], \text{ where}$$

where
   (k) is the consecutive number of the view ($A_k$) (k=1 . . . n) from which the bit of partial information to be rendered on a particular pixel $\alpha_{ij}$ originates,
   (n) is the total number of views ($A_k$) (k=1 . . . n) employed,
   (n') is a selectable integral number greater than zero,
   ($c_{ij}$) is a selectable coefficient matrix for combining or mixing on the grid the various bits of partial information originating from the views ($A_k$) with (k=1 . . . n), and
   IntegerPart is a function for generating the greatest integral number that does not exceed the argument put in square brackets;
   assigning a transmission wavelength range and/or transmittance ($\lambda_b$), to elements ($\beta_{pq}$) of the filter array, according to the following equation:

$$b = p - d_{pq} \cdot q - n_m \cdot IntegerPart\left[\frac{p - d_{pq} \cdot q - 1}{n_m}\right], \text{ where}$$

where (b) is an integral number that, for a filter element ($\beta_{pq}$) in the position (p,q), defines one of the intended transmission wavelength ranges and/or transmittances ($\lambda_b$), and that may adopt values between 1 and ($b_{max}$), ($n_m$) is an integral number greater than zero that preferably corresponds to the integral number (n'), ($d_{pq}$) is a selectable mask coefficient matrix for varying the generation of a mask image, and IntegerPart is a function for generating the greatest integral number that does not exceed the argument put in square brackets;

assigning values to the selectable mask coefficient matrix ($d_{pq}$) according to the following equation:

$$d_{pq} = \frac{p - \left(IntegerPart\left(\left(\frac{p}{2} + \frac{q}{2}\right) - 1\right)\mod 4 + 1\right)}{q}; \text{ and}$$

and displaying partial image information from different views ($A_k$), in an alternating way by pixels in less than all rows (j) and columns (i), such that, from at least two monocular viewing positions, exclusively or almost exclusively partial image information from a single view ($A_k$) is visible to one of a viewer's eyes and, further, from a great number of viewing positions, bits of partial image information from different views ($A_k$) are visible monocularly to both eyes of the viewer.

* * * * *